(12) United States Patent
Lehmann et al.

(10) Patent No.: US 10,919,086 B2
(45) Date of Patent: Feb. 16, 2021

(54) METHOD FOR PRODUCING REFRACTORY COMPOSITE PARTICLES AND FEEDER ELEMENTS FOR THE FOUNDRY INDUSTRY, CORRESPONDING FEEDER ELEMENTS AND USES

(71) Applicant: HÜTTENES-ALBERTUS CHEMISCHE WERKE GESELLSCHAFT MIT BESCHRÄNKTER HAFTUNG, Düsseldorf (DE)

(72) Inventors: Sandra Lehmann, Potsdam (DE); Klaus Riemann, Wunstorf (DE); Nils Zimmer, Garbsen (DE); Hermann Lieber, Langenhagen (DE); Jürgen Hübert, Langenhagen (DE)

(73) Assignee: HÜTTENES-ALBERTUS CHEMISCHE WERKE GESELLSCHAFT MIT BESCHRÄNKTER HAFTUNG, Düsseldorf (DE)

( * ) Notice: Subject to any disclaimer, the term of this patent is extended or adjusted under 35 U.S.C. 154(b) by 93 days.

(21) Appl. No.: 15/780,838

(22) PCT Filed: Dec. 1, 2016

(86) PCT No.: PCT/EP2016/079371
§ 371 (c)(1),
(2) Date: Jun. 1, 2018

(87) PCT Pub. No.: WO2017/093371
PCT Pub. Date: Jun. 8, 2017

(65) Prior Publication Data
US 2018/0345356 A1    Dec. 6, 2018

(30) Foreign Application Priority Data
Dec. 1, 2015    (DE) ............... 10 2015 120 866.0

(51) Int. Cl.
| | | |
|---|---|---|
| B22C 1/22 | (2006.01) | |
| B22C 1/20 | (2006.01) | |
| B22C 1/02 | (2006.01) | |
| B22C 9/08 | (2006.01) | |
| B22D 7/10 | (2006.01) | |

(52) U.S. Cl.
CPC .............. *B22C 1/2273* (2013.01); *B22C 1/02* (2013.01); *B22C 1/20* (2013.01); *B22C 9/088* (2013.01); *B22D 7/10* (2013.01)

(58) Field of Classification Search
CPC ......... B22C 1/2273; B22C 1/20; B22C 9/088; B22C 1/22; B22C 1/02; B22D 7/10; C04B 35/628
USPC ....................................................... 523/139
See application file for complete search history.

(56) References Cited

U.S. PATENT DOCUMENTS

| | | | |
|---|---|---|---|
| 3,341,339 A | 9/1967 | Stein | |
| 4,166,147 A | 8/1979 | Lange et al. | |
| 5,948,438 A | 9/1999 | Staniforth et al. | |
| 9,352,385 B2 | 5/2016 | Lanver et al. | |
| 2001/0022999 A1* | 9/2001 | Twardowska ............ | B22C 1/00 428/34.6 |
| 2004/0050526 A1* | 3/2004 | Skerdi .................... | B22C 9/084 164/359 |
| 2012/0295026 A1* | 11/2012 | Courtois ............... | C04B 35/111 427/213.31 |
| 2014/0235750 A1* | 8/2014 | Recknagel ............ | C04B 18/101 523/142 |
| 2015/0174255 A1 | 6/2015 | Magome et al. | |

FOREIGN PATENT DOCUMENTS

| | | |
|---|---|---|
| CN | 102712539 | 10/2012 |
| CN | 102958980 | 3/2013 |
| CN | 103130523 | 6/2013 |
| DE | 2214073 | 9/1973 |
| DE | 4125133 | 2/1993 |
| DE | 19706743 | 10/1997 |
| DE | 19830795 | 1/2000 |
| DE | 10058221 | 7/2001 |
| DE | 10217138 | 2/2004 |
| DE | 102004047097 | 4/2006 |
| DE | 102005011644 | 9/2006 |
| DE | 102006030875 | 1/2008 |
| DE | 102008036094 | 2/2010 |
| DE | 102012200967 | 7/2013 |
| EP | 0639544 | 2/1995 |
| EP | 0762945 | 3/1997 |
| FR | 2403979 | 4/1979 |
| GB | 1580041 | 11/1980 |
| JP | H06106299 | 4/1994 |
| JP | 2000317578 | 11/2000 |
| JP | 2015199660 | 11/2015 |

(Continued)

*Primary Examiner* — Doris L Lee
(74) *Attorney, Agent, or Firm* — Duane Morris LLP; Gregory M. Lefkowitz; Jason M. Nolan

(57) ABSTRACT

A method for producing a feeder element is described. The method includes (a) producing composite particles having a particle size of less than 2 mm in a matrix encapsulation method with the following steps: (a1) producing droplets of a suspension from at least (i) one or more refractory substances, (ii) one or more of fillers having a bulk density in the range from 10 to 350 g/L, expandants, and pyrolysable fillers, (iii) as continuous phase, a solidifiable liquid, (a2) solidifying the droplets with the refractory substance(s) and density-reducing substance(s) are encapsulated therein, (a3) treating the hardened droplets to form composite particles, (b) mixing the composite particles with a binder and, optionally, further constituents to give a feeder composition, (c) shaping and curing the feeder composition to give a feeder element. Also described are a method for producing refractory composite particles and the use of the composite particles.

19 Claims, 15 Drawing Sheets

(56) References Cited

FOREIGN PATENT DOCUMENTS

Figure 1:

| WO | 9200799 | 1/1992 |
| WO | 9924159 | 5/1999 |
| WO | 0020353 | 4/2000 |
| WO | 0181243 | 11/2001 |
| WO | 2008110378 | 9/2008 |
| WO | 2012036953 | 3/2012 |
| WO | 2013014118 | 1/2013 |

* cited by examiner

METHOD FOR PRODUCING REFRACTORY COMPOSITE PARTICLES AND FEEDER ELEMENTS FOR THE FOUNDRY INDUSTRY, CORRESPONDING FEEDER ELEMENTS AND USES

CROSS-REFERENCE TO RELATED APPLICATIONS

This application is a § 371 national stage entry of International Application No. PCT/EP2016/079371, filed on Dec. 1, 2016, which claims priority to German Patent Application No. 10 2015 120 866.0, filed on Dec. 1, 2015, the entire contents of which are incorporated herein by reference.

The present invention relates to a method for producing a feeder element for the foundry industry, to such a feeder element, to the use of a matrix encapsulation method for producing composite particles, and to the use of sealed composite particles. The invention also relates to a method for producing refractory composite particles and the use thereof. The invention is defined in the appended claims and in the corresponding passages of the description.

The term "feeder" or "feeder element" for the purposes of the present papers embraces not only feeder jackets, feeder inserts and feeder caps but also heating pads.

In the production of shaped metallic components in a foundry, liquid metal is introduced into a casting mould, where it solidifies. The solidification process is accompanied by a reduction in the metal volume, and generally, therefore, feeders, these being open or closed spaces in or on the casting mould, are used in order to compensate the volume deficit during the solidification of the casting and so to prevent the formation of voids in the casting. Feeders are connected to the casting or to the region of the casting that is at risk, and are commonly located above and/or at the side of the mould cavity. In feeder compositions for producing feeders, and in the feeders themselves that are produced from these compositions, it is nowadays usual to use lightweight fillers, which are intended to exhibit a good insulating effect in conjunction with a high temperature stability and low weight.

A principal constituent of insulating and exothermic feeders and feeder compositions is one or else two or more refractory fillers. On the one hand these form the scaffold structure of a feeder, and on the other hand they are major determinants of the insulating effect or positive heat balance in the feeder and hence of good feeder efficiency.

Besides the bulk density, the thermal stability is one of the most important criteria for the selection of a suitable refractory filler for feeders. The nature of the filler composition, whether insulating or exothermic in its activity, and also the service range of the feeders are critical determinants of the requirements with regard to the refractory filler.

EP 2 139 626 B1 relates to a "pourable filling material for use as a filler for feeder compositions for producing feeders" (see claim 1). The filling material comprises core-shell particles. Paragraph [0023] discloses a preferred bulk density of 85 g/L to 500 g/L.

WO 2013/014118 A2 relates to a "Feeder and shapeable composition for production thereof" (title). Rice husk ash is used as filler.

DE 10 2012 200 967 A1 relates to "Feeder and shapeable composition for production thereof comprising calcined kieselguhr" (title). The feeders claimed are produced by methods including the polyurethane cold-box process. The calcined kieselguhr disclosed is said to have a bulk density of 600 g/L or more.

Further prior art for consideration is disclosed in US 2012/0295026 A1, DE 10 2010 045 479 A1 and DE 11 2008 000 701 B4.

In industrial practice it is common to use spheres (especially those of fly ash) in feeders. These spheres can be divided into different quality grades, resulting in particular from the $Al_2O_3$ content and from the fraction of alkali metals and alkaline-earth metals and also accompanying elements such as iron. For the copper, iron and steel casting sector, in particular, particularly high-grade qualities of sphere are required in practice; however, such high-grade spheres are limited in quantity and/or very expensive, and so there is a continual need for alternatives that are available reproducibly.

Examples of known lightweight fillers include expanded glass from Liaver and foam glass from Poraver, hollow glass beads of type $K_2O$ from Omega, and expanded perlites. These raw materials, however, are generally not suitable for use in copper and iron casting and particularly in steel casting and in casting with exothermic compositions without additional enhancement (such as the application of a refractory jacket, for example), since the melting points of the raw materials are below 1000° C., but are usually in the 700 to 900° C. range, and this temperature is exceeded during casting (see also the table "Requisite thermal stability" below).

Table "Requisite thermal stability"

| | Type of casting in the feeder industry | | | | |
|---|---|---|---|---|---|
| | Aluminium casting | Copper casting | Iron casting | Steel casting | Exothermic compositions |
| Minimum required thermal stability | 800° C. | 1200° C. | 1400° C. | 1500° C. | 1700° C. |

One raw material which has a thermal stability of up to about 2000° C. and therefore can be used in feeders for copper, iron and steel casting is hollow bead corundum ($Al_2O_3$). On account of its high bulk density of around 750 to 1000 g/L (depending on the production process), however, the use of hollow bead corundum in feeders is generally not economic. Moreover, the high thermal conductivity of the hollow bead corundum is a disadvantage for use in feeders, where of course a good insulating effect is critical.

Common raw materials for feeders are silica sand and chamotte. These inexpensive raw materials do have a thermal stability in the temperature range of 1700-1800° C., but possess high bulk densities and comparatively poor insulating properties. A refractory insulating raw material for feeds for use in iron and steel casting, with lower bulk density than hollow bead corundum, silica sand and chamotte, are core-shell particles from Chemex GmbH. These particles possess a glass core and a refractory shell, and the bulk density is frequently in the range of 470-500 g/L. The bulk densities indicated above are perceived as being still too high for certain purposes.

In internal investigations it was found that the morphology of the (lightweight) fillers in a feeder element for the foundry industry has a considerable influence on the mechanical properties of the said element (strength, gas permeability, etc.). Spherical lightweight fillers are preferred in many cases for the attainment of high strengths and gas permeabilities.

It was a primary object of the present invention to specify an improved method for producing a feeder element for the foundry industry, which can be readily adapted to the practical requirements relating to the properties of the particles present in the feeder. The method to be specified ought to lead to a feeder which comprises particles having a particle size of less than 2 mm. The particles—depending on the individual embodiment of the method to be specified—ought to possess a low bulk density and/or high thermal stability.

The method to be specified ought preferably to encompass or allow the use or the production of filler particles possessing one or more, preferably all, of the following properties:
  particularly high thermal stability,
  excellent insulation characteristics,
  high pourability,
  high sphericity,
  free-flowability
  and
  a bulk density of less than 350 g/L.

The method to be specified for producing a feeder element for the foundry industry ought to be flexibly adjustable with regard to the production and the use of filler particles of variable size; in particular, the method ought to allow the production and the use of filler particles having a particle size of less than 2 mm (preferably less than 0.8 mm) in the production of a feeder element. The filler particles to be produced and used ought to be able to have variable compositions. Through this variability and flexibility of the method to be specified it is to be possible to produce a feeder element whose physical properties are adapted individually to the requirements of the particular case. The method to be specified for producing a feeder element for the foundry industry is therefore to be more independent of the market availability of filler particles of defined size and composition than are the existing methods for producing a feeder element for the foundry industry.

In particular, the method to be specified ought to be suitable for producing an exothermic feeder element and an exothermic or insulating (non-exothermic) feeder element for use in the casting of iron, steel or copper.

A further object of the present invention was to specify a corresponding feeder element. Other objects of the present invention are apparent, mutatis mutandis, from the above observations and from the corresponding explanations in the text below.

The stated primary object concerning the method to be specified is achieved in accordance with the invention by means of a method for producing a feeder element for the foundry industry, comprising the following steps:
  (a) producing (preferably refractory, more preferably highly refractory) composite particles having a particle size of less than 2 mm, determined by sieving, in a matrix encapsulation method with the following steps:
    (a1) producing droplets of a suspension from at least the following starting materials:
      (i) one or more refractory substances selected from the group consisting of
      refractory solids and precursors of refractory solids,
      (ii) one or more density-reducing substances selected from the group consisting of
      lightweight fillers having a respective bulk density in the range from 10 to 350 g/L, preferably in the range from 10 to 250 g/L, very preferably in the range from 10 to 100 g/L, expandants and pyrolysable fillers,
      (iii) as continuous phase, a solidifiable liquid,
    (a2) solidifying the solidifiable liquid, so that the droplets harden to hardened droplets and the refractory substance or substances and also the density-reducing substance or substances are encapsulated in the solidifying continuous phase,
    (a3) treating (preferably heat-treating) the hardened droplets, so that the said composite particles result,
  (b) mixing the composite particles produced in step (a) or a fraction of these composite particles with a binder and also, optionally, further constituents to give a feeder composition,
  (c) shaping and curing the feeder composition to give a feeder element.

The invention is based on the finding that through matrix encapsulation of the starting materials indicated in step (a1) (see sections (i) to (iii) in step (a1)) it is possible to produce composite particles which possess the primary properties listed above.

The composite particles produced in the method of the invention possess a particle size of less than 2 mm, determined by sieving. The determining by sieving takes place according to DIN 66165-2 (4.1987) using method F as specified therein (machine sieving with agitated single sieve or sieve set in gaseous fluid at rest). A Retsch AS 200 control vibrational sieving machine is used, with the amplitude set at level 2, without interval sieving, and with a sieving time of 1 minute.

The term "refractory solids" encompasses solids to be designated "refractory" according to DIN 51060; the term "refractory solids" further encompasses the solids from the group consisting of aluminium oxide, zirconium oxide, titanium dioxide, graphite, silicon dioxide, magnesium oxide, calcium oxide, calcium silicate, phyllosilicates (preferably mica), aluminium silicates, magnesium aluminium silicate (preferably cordierite), silicon carbide, boron nitride, mixed oxides containing one or more metal atoms of the aforementioned metal oxides, and mixed silicates containing one or more metal atoms of the aforementioned metal silicates.

"Precursors of refractory solids" are materials which when the hardened droplets are treated (step (a3)) turn into "refractory solids" as defined above, by means of a heat treatment, for example.

For the purposes of the present invention, a particle or material (e.g. a quantity of particles of the same composition) is considered to be thermally stable if the particle or the material does not melt, does not soften with loss of three-dimensional form or even does not decompose below a given upper temperature limit (e.g. 1600° C. or 1700° C.). A quantity of particles of the same composition is considered to be thermally stable especially when it does not sinter in a sintering test at a defined temperature. Regarding the implementation of the sintering test, see "Method for determining thermal stability (sintering test)" below.

The feature of "producing droplets of a suspension from at least the following starting materials" encompasses the "producing of droplets of a suspension from exclusively the following starting materials", and also the "producing of droplets of a suspension from the following starting materials and further starting materials".

A "matrix encapsulation method" is understood in the present text to be a method in which, first of all, droplets of a dispersion are produced, the dispersion comprising a substance which is present in the solid or liquid state and is in suspension in a matrix (continuous phase). From the droplets, by solidification and optional subsequent treatment, composite particles are produced. The method of the invention comprises in its step (a) a specific matrix encapsulation method having the sub-steps defined above. The matrix encapsulation method differs from a typical method for producing core-shell particles in that in core-shell particles the shell material envelops only a single core. This single core of a typical core-shell particle customarily does not comprise a binder which binds other constituents of the core. Customarily, and this is also the case in particular for the composite particles produced by means of the specific matrix encapsulation method as per step (a) of the method of the invention, a composite particle produced by means of the matrix encapsulation method comprises more than 5, preferably more than 50, discrete microparticles consisting of refractory solid; preferred refractory solids are given later on below. Composite particles of this kind are preferred in accordance with the invention.

"Density-reducing substances" are substances which when used in the method of the invention produce a reduced bulk density on the part of the composite particles resulting in step (a3), in comparison with a non-inventive (comparative) method which is carried out identically but in which, for the purpose of the comparison, these "density-reducing substances" are not used. Depending on the treatment of a hardened droplet, an expandant used or a pyrolysable filler used may or may not expand or be pyrolysed. Only if (in step (a3)) an expandant used expands or a pyrolysable filler used is pyrolysed does it fulfil the criterion of being "density-reducing".

"Lightweight fillers" used in accordance with the invention are fillers having in each case a bulk density in the range from 10 to 350 g/L. Lightweight fillers typically used in the foundry and preferred for use in the method of the invention are spheres, preferably spheres of fly ash, such as "Fillite 106" spheres from Omya GmbH, expanded perlite such as, for example, expanded perlite with the names "Eurocell 140", "Eurocell 145", "Eurocell 150" or "Eurocell 300" from RS Rohstoff-Sourcing GmbH or glass such as, for example, the glass with the name "GHL 450" from LUH Georg H. Luh GmbH, the product with the name "JJ Glass Bubbles" from Jebsen & Jessen GmbH&Co. KG, the product with the name "Q-Cel® 300" from Potters Industries or the products "K1", "K15" or "K20" from 3M.

"Expandants" are substances which when the hardened droplets are treated in step (a3), such as on heating, for example, expand or release expansion gases and thereby generate cavities in the composite particle.

"Pyrolysable fillers" are fillers which when the hardened droplets are treated in step (a3), such as on heating, for example, undergo partial or complete, preferably complete, pyrolysis.

A pyrolysable filler may at the same time be a lightweight filler having a respective bulk density in the range from 10 to 350 g/L. A pyrolysable filler may at the same time be an expandant. An expandant may at the same time be a lightweight filler having a respective bulk density in the range from 10 to 350 g/L.

On account of the use of the density-reducing substances in step (ii), composite particles produced in step (a) of the method of the invention possess a particularly low bulk density, but a bulk density adjusted individually in accordance with the requirements of the particular case, and, especially when using expandants and/or pyrolysable fillers, possess a high porosity, but a porosity adjusted individually in accordance with the requirements of the particular case, and so the resultant, individually produced composite particles possess a high insulating effect in conjunction with low bulk density.

In step (b) of the method of the invention, the composite particles produced in step (a), or a fraction of these particles, are mixed with a binder and also, optionally, further constituents to give a feeder composition. A fraction of the composite particles produced in step (a) may be separated off here in any desired way, with or without restriction to composite particles having a defined particle size. Particularly if only particles having a defined particle size, of the composite particles resulting in step (a3), are to be used in step (b), fractionation by sieving is preferred.

In a method of the invention for producing a feeder element for the foundry industry, step (b) sees the use, preferably, of one or more binders which are selected from the group consisting of:

organic binders, e.g. (i) cold-box binder components, preferably components of a 2-component binder system for producing a polyurethane from a benzyl ether resin and a polyisocyanate, (ii) hot-box binder components, (iii) starch and (iv) polysaccharides and inorganic binders, e.g. waterglass, optionally in combination with amorphous silicon dioxide.

Especially preferred in this context is a method of the invention wherein the total amount of binders used in step (b) is in the range from 1 to 50 wt %, more preferably in the range from 5 to 30 wt %, especially preferably in the range from 10 to 20 wt %, based on the total mass of the feeder composition produced in step (b).

In connection with the present invention, attention is drawn to the following literature references, which the skilled person will consult, depending on the requirements of the particular case.

DE 2 214 073 A1 discloses "Method and apparatus for producing expanded ceramic products" (title). The ceramic products here preferably have a diameter of below 5 mm and bulk densities of 0.1 to 1 kg/L.

DE 2 418 027 A1 relates to "Shaped articles of titanium dioxide" (title). DE 2 714 139 A1 relates to a "Method for producing a refractory material". GB 2 034 678 B relates to "Balls containing tungsten carbide" (title).

DE 69 122 393 T (corresponding to EP 0 538 350 B1) relates to "Conglomerate carrier material" (title). This material can be produced here by the addition of suitable metal ions to alginates.

DE 69 424 232 T2 (corresponding to EP 0 639 544 B1) relates to "Reticulated ceramic particles" (title).

DE 19 706 743 A1 relates to a "Refractory composition" (title).

DE 19830795 A1 relates to "Porous ceramics" (title).

DE 699 14 207 T (corresponding to EP 1 117 626 B1) relates to "Foamed ceramics" (title).

DE 69 817 009 T (corresponding to EP 1030734 B1) relates to an "Encapsulate of active material in alginate matrix" (title).

DE 10 058 221 A1 relates to "Method and apparatus for producing alginate beads of high strength".

DE 60 103 638 T (corresponding to EP 1 280 732 B1) relates to "Calcium phosphate microgranules" (title).

DE 10 217 138 relates to "Spherical particles of actinide oxides".

EP 1 794 277 B1 relates to "Washing and cleaning products comprising immobilized active ingredients" (title). DE 10 2008 036 094 A1 discloses "Spherical semiconductor-metal granules" (title).

DE 4 125 133 C2 relates to "Method and apparatus for producing alginate beads" (title).

Preferred is a method of the invention as described above (more particularly a method designated above or below as preferable or preferred), wherein in step (a1) droplets are produced by means of one or more nozzles, preferably vibrational nozzles, and/or in step (a2) the solidifying of the solidifiable liquid is induced by cooling, drying or chemical reaction.

The use of one or more nozzles, preferably vibrational nozzles, is preferred in step (a1) in order to produce the composite particles in a time-efficient manner and with an extremely uniform particle size.

Preference is given to a method of the invention as described above (more particularly a method designated above or below as being preferred or preferable) wherein the solidifiable liquid used in step (a1) is a liquid which is solidifiable by chemical reaction and in step (a2) the solidifying of the solidifiable liquid is induced by chemical reaction.

The solidifying of the solidifiable liquid by chemical reaction has the advantage that this operation is generally irreversible and, moreover, is sufficiently quick that, during dropwise introduction and hence during solidification of the solidifiable liquid, the solidifiable liquid generally retains the droplet form. Solidifications by physical methods, such as cooling or drying, for example, are in some cases reversible and in such cases may be (at least partially) reversed through the supply of heat or moisture, for example.

Particularly preferred is a method of the invention as described above (more particularly a method designated above or below as being preferred or preferable) wherein the solidifiable liquid is a liquid solidifiable by cation exchange reaction, preferably a liquid solidifiable by reaction with calcium ions and/or barium ions and/or manganese ions, preferably by reaction with calcium ions.

Cation exchange reactions possess the advantage in practice that they are generally concluded within a comparatively short time period.

Preferred here in step (a2) is the implementation of a cation exchange reaction in which the solidifiable liquid comprises monovalent cations and is brought into contact with calcium ions in order thus to solidify the solidifiable liquid; instead of calcium ions, however, barium ions or manganese ions can also be used. Monovalent cations present in the solidifiable liquid are replaced by calcium ions in the course of the preferred procedure, in order thereby to solidify the solidifiable liquid. Calcium ions possess a well-balanced relation between charge and ion mobility. The following is generally the case, in fact: the charge on the cation which is to be replaced by the monovalent cation present in the solidifiable liquid ought to be as high as possible, so that compounds of low solubility are formed in the cation exchange. This cation, however, is also to have a very high ion mobility, so that the desired chemical reaction proceeds as quickly as possible. Ion mobility of cations goes down with increasing cation charge.

Particularly preferred is a method of the invention as described above (more particularly a method designated above or below as being preferred or preferable) wherein the solidifiable liquid is a liquid solidifiable by reaction with calcium ions, which comprises one or more binders selected from the group consisting of alginate, PVA, chitosan and sulphoxyethylcellulose, and/or (preferably "and")

is an aqueous solution, in which case the solidifiable liquid is preferably an aqueous alginate solution, wherein the solidifiable liquid more preferably is an aqueous sodium alginate solution.

Alginate solutions, more particularly sodium alginate solutions, preferably in the form of an aqueous solution, are particularly suitable for use as a liquid solidifiable by reaction with calcium ions in a method of the invention, since they are eco-friendly, degradable and, in particular, non-toxic. Moreover, alginate solutions of this kind can be solidified reproducibly and in a standardized manner. The composite particles obtained in in-house investigations, produced using alginate solutions as solidifiable liquid, possessed a unitary construction with uniformly distributed or arranged particles of refractory substances.

Preferred is a method of the invention as described above (more particularly a method designated above or below as being preferred or preferable) wherein the lightweight filler or at least one of the lightweight fillers used in step (a) as density-reducing substance of component (ii), preferably having a particle size of less than 0.8 mm, more preferably less than 0.5 mm, very preferably less than 0.3 mm, determined by sieving (regarding the method of determination, see above), is selected from the group consisting of:

inorganic hollow beads, organic hollow beads, particles of porous and/or foamed material, rice husk ash, core-shell particles and calcined kieselguhr and/or wherein the expandant or at least one of the expandants used in step (a) as component (ii) is selected from the group consisting of:

carbonates, hydrogencarbonates and oxalates, preferably with cations from the group consisting of alkali metals and alkaline earth metals, preferably calcium carbonates, calcium hydrogencarbonates and calcium oxalates, coconut shell flour, preferably coconut shell flour with the name "Coconit 300" from Mahlwerk Neubauer-Friedrich Geffers GmbH, walnut shell flour, preferably walnut shell flour with the name "Walnusschalenmehl 200m" from Ziegler Minerals, grape kernel flour, preferably grape kernel flour with the name "Traubenkernmehl M100" from A+S BioTec, olive stone flour, preferably olive stone flour with the names "OM2000" or "OM3000" from JELU-Werk, starch, wheat flour, preferably wheat flour with the name "Mehl 405" from Hummel, maize flour, preferably maize flour with the name "Maismehl MK100" from Hummel, potato dextrin, sugars, e.g. sucrose, plant seeds, wood flour, preferably wood flour with the name "Holzmehl Ligno-Tech 120mesh TR" from Brandenburg Holzmühle, and rice husk ash, preferably rice husk ash with a high carbon fraction, e.g. a rice husk ash with the name "Nermat AF (<80 μm)" from Refratech, and/or wherein the pyrolysable filler or at least one of the pyrolysable fillers used in step (a) as component (ii) is selected from the group consisting of:

plastics beads, preferably "Expancel® 091 DE 80 d30" plastics beads from Akzo Nobel or "Sphere One Extendospheres™ PM 6550 Hollow Plastic Spheres" plastics beads from KISH Company Inc.

and

Styropor beads, preferably Styropor beads "F655-N" from BASF.

More particularly preferred is a method of the invention as described above (more particularly a method designated above or below as being preferred or preferable) wherein the total amount of lightweight fillers used is in the range up to 30 wt %, more preferably in the range from 1 to 10 wt %, especially preferably in the range from 3 to 5 wt %, based on the total mass of the suspension prepared in step (a1), and/or the total amount of expandants used is in the range up to 30 wt %, more preferably in the range from 1 to 20 wt %, especially preferably in the range from 3 to 10 wt %, based on the total mass of the suspension prepared in step (a1), and/or the total amount of pyrolysable fillers used is in the range up to 30 wt %, more preferably in the range from 1 to 20 wt %, especially preferably in the range from 3 to 10 wt %, based on the total mass of the suspension prepared in step (a1).

The total amount of the density-reducing substances used is preferably in the range from 3 to 10 wt %, based on the total mass of the suspension prepared in step (a1).

The above pyrolysable fillers used as component (ii) may be used individually or in combination.

Particularly preferred is a method of the invention wherein at least one of the expandants used as component (ii) in step (a) is selected from the group consisting of:

wood flour, preferably wood flour with the name "Holzmehl Ligno-Tech 120mesh TR" from Brandenburg Holzmühle, maize flour, preferably maize flour with the name "Maismehl MK100" from Hummel, sugars, e.g. sucrose.

The above expandants used as component (ii) may be used individually or in combination.

The density-reducing substances stated above (such as, for example, lightweight fillers, expandants or pyrolysable fillers) for producing composite particles with particularly low bulk density are readily available on the market. Their use in the method of the invention enables lightweight, highly insulating feeder elements for the foundry industry to be produced reproducibly.

Preferred is a method of the invention as described above (more particularly a method designated above or below as being preferred or preferable) wherein the refractory solid or at least one of the refractory solids used in step (a1) as refractory substance of component (i) is selected from the group consisting of:

oxides, nitrides and carbides, each comprising one or more elements from the group consisting of Si, Al, Zr, Ti, Mg and Ca, mixed oxides, mixed carbides and mixed nitrides, each comprising one or more elements from the group consisting of Si, Al, Zr, Ti, Mg and Ca, and graphite, wherein preferably the refractory solid or at least one of the refractory solids used in step (a1) as refractory substance of component (i) is selected from the group consisting of:

aluminium oxide (e.g. CAS No. 21645-51-2), zirconium oxide (e.g. CAS number 1314-23-4), titanium dioxide (e.g. CAS number 13463-67-7), graphite (e.g. CAS number 7782-42-5), silicon dioxide (e.g. quartz with the CAS number: 14808-60-7 or vitreous $SiO_2$ with the CAS number: 60676-86-0), magnesium oxide (e.g. CAS number: 1309-48-4), calcium oxide (e.g. CAS number 1305-78-8), calcium silicate (e.g. CAS number: 1344-95-2), phyllosilicates, preferably mica, aluminium silicates, magnesium aluminium silicate, preferably cordierite, silicon carbide, and boron nitride and/or the precursor or at least one of the precursors of refractory solids that is used in step (a1) as refractory substance of component (i) is selected from the group consisting of:

aluminium hydroxide (e.g. CAS number: 1344-28-1), magnesium hydroxide (e.g. CAS number: 1309-42-8), phyllosilicates, preferably kaolinite, montmorillonite and illite, clays, preferably kaolin and bentonite, phosphates such as tricalcium phosphate (e.g. CAS number: 7758-87-4)

and carbonates such as calcium carbonate, and magnesiumcarbonate (e.g. CAS numbers: 546-93-0 (anhydrous), 13717-00-5 (monohydrate), 5145-48-2 (dihydrate), 14457-83-1 (trihydrate), 61042-72-6 (pentahydrate)).

Especially preferred is a method of the invention as described above (more particularly a method designated above or below as being preferred or preferable) wherein the total amount of refractory substances used in step (a1) is in the range from 1 to 70 wt %, more preferably in the range from 5 to 50 wt %, very preferably in the range from 10 to 30 wt %, based on the total mass of the suspension produced in step (a1).

All the abovementioned species may also be used in a mixture with one another, e.g. carbonates/phosphates in the form of bone ash.

Refractory Substances:

The refractory solids identified above may be used individually or in combination. The above precursors may be used individually or in combination. It is possible to use exclusively refractory solids or exclusively precursors, or both in combination with one another.

Phyllosilicates:

Preferred phyllosilicates for use as refractory solids are the following:

"Pyrax® RG-140" from C. H. Erbslöh

"Mica G" from Aspanger Bergbau and Mineralwerke GmbH

"Mica-MG 160" from Denain-Anzin Minéraux and micas from Aspanger Bergbau and Mineralwerke GmbH with the name "Glimmer CMG".

The above preferred phyllosilicates may be used individually or in combination.

Oxides:
In some cases, however, it is advantageous for certain oxides to be used as refractory substance of component (i) in step (a1), with at least one of these oxides being selected from the group consisting of:
aluminium oxide (e.g. CAS No. 21645-51-2),
zirconium oxide (e.g. CAS number 1314-23-4),
titanium dioxide (e.g. CAS number 13463-67-7),
silicon dioxide (e.g. quartz with the CAS number: 14808-60-7 or vitreous $SiO_2$ with the CAS number: 60676-86-0),
magnesium oxide (e.g. CAS number: 1309-48-4),
and
calcium oxide (e.g. CAS number 1305-78-8).

The above oxides can be used individually or in combination.

Preferred aluminium oxides here are the "Nabalox® NO315" aluminium oxide from Nabaltec AG, the "Alodur® EK Si" aluminium oxide from Treibacher Schleifmittel, the "Alumina DF2" aluminium oxide from MAL Magyar Aluminium, and the "Edelkorund weiß EK-Filterstaub" aluminium oxide from Wester Mineralien.

A preferred combination of metal oxides here is a mixture of aluminium oxide and zirconium oxide such as, for example, "Alodur® ZKSF" from Treibacher Schleifmittel.

Preferred silicon oxides here are the "Sillimat GS (<80 μm)" silicon oxide from Refratech, the "Kalzinierte Reisspelzen" silicon oxide from Ziegler Mineralstoffe, the "Aerosil 200" silicon oxide from Evonik, the "SiO2 RW-Füller Q1 plus" silicon oxide from RW Silicium GmbH, and the "Millisil-Mehl W8" silicon oxide from Quarzwerke.

A preferred calcium silicate is the "China Wollastonit TMM S.G." calcium silicate from Possehl Erzkontor.

Aluminium Silicates:
Preferred aluminium silicates for use as refractory solids and/or precursors are magnesium aluminium silicates and the following aluminium silicates:
"Andalusit 200mesh", "Andalusit 120mesh" or "Kysil 58" from Europe Minerals,
"Marlusit DIN 80" from Cofermin Rohstoffe,
"Kyanit 100mesh/200mesh" from Possehl Erzkontor,
"Kyanit 40-120mesh" from Ziegler Mineralstoffe,
"Kaolinschamotte PrimaCal 50" from Sibelco Deutschland Westerwald,
"Porzellanmehl" from Franz Mandt,
"Molochit 120/200" from IMERYS UK
and
mullite.

Magnesium aluminium silicates and/or the abovementioned preferred aluminium silicates can be used individually or in combination.

Preferred magnesium aluminium silicates for use as refractory solids are cordierites, preferably "Cordierit C 65" from České Lupkové Závody S. A., "Cordierit B" from Alroko GmbH & Co KG, and "Cordierit 0-1 mm" or "Cordierit DIN 70" from Spitzer Rohstoffhandelsgesellschaft mbH.

These preferred magnesium aluminium silicates can be used individually or in combination.

The abovementioned compounds or mixtures can be used in combination with one another as refractory solids for the purposes of the present invention. The skilled person is able for example to custom-tailor the desired thermal stability of the composite particles and the bulk density, which is dependent thereon only to a certain degree, through the nature and amount of the refractory solids. The same applies to the below-specified preferred precursors of refractory solids, to combinations of these preferred precursors, and to combinations of preferred precursors of refractory solids with preferred refractory solids as described above.

Precursors:
A preferred mixture for use as precursors of refractory solids is bone ash, e.g., "CALTAN Knochenasche" from Neue Leimfabrik Tangermunde GmbH.

Particularly preferred kaolins for use as precursors of refractory solids are:
"Chinafill 100" or "Kaolin TEC" from Amberger Kaolinwerke
"Kärlicher Blautonmehl" from KM'licher Ton- and Schamottewerke Mannheim & Co.KG
"Satintone W" from Solvadis Chemag GmbH
and
"Kaolin Burgess No. 20" or "Kaolin Burgess BSC SD" from Omya.

The above particularly preferred kaolins may be used individually or in combination.

Particularly preferred bentonites for use as precursors of refractory solids are:
"Bentone 27" or "Bentone EW" from Elementis Specialities,
"Bentonit B" (e.g. CAS number: 1302-78-9) from C. H. Erbslöh
and
"Bentonit Volclay" from Süd Chemie.

The above particularly preferred bentonites may be used individually or in combination.

The use of the abovementioned preferred refractory substances leads to composite particles having particular thermal stability (refractory).

It is understood that the refractory substances in step (a1) are present preferably in the form of unaggregated and unagglomerated particles, with the ratio of the maximum particle size (as defined above) of the particles of the refractory substances to the maximum particle size of the composite particles produced in the method of the invention being preferably in the range from 0.01 to 0.2. In this way it is possible for numerous particles of the refractory substances to be arranged in a single composite particle.

Refractory substances used in step (a1) are preferably particles, more preferably particles of refractory solids, preferably refractory solids having a particle size of less than 0.1 mm as determined by sieving in accordance with DIN 66165-2 (4.1987) using the therein-stated method D (machine sieving with resting individual sieve in agitated gaseous fluid, with air jet sieve).

Preference is given to a method of the invention as described above (more particularly a method designated above or below as being preferred or preferable) wherein
the treating as per step (a3) is carried out such that the bulk density of the resultant composite particles is lower than the bulk density of the hardened droplets in the dried state (this is accomplished particularly easily, for example, when using density-reducing substances selected from the group consisting of expandants and pyrolysable fillers, when the treatment is carried out such that it leads to the expansion of the expandants and/or the pyrolysis of the pyrolysable fillers)
and/or
the said composite particles possess a bulk density <700 g/L, preferably <400 g/L, more preferably <300 g/L.

In the context of the present invention it has been recognized that given a targeted selection of the constituents (i), (ii) and (iii) used in step (a1), by means of a targeted treatment of the hardened droplets in step (a3), it is possible to achieve a reduction in bulk density that is necessary in many cases (by the pyrolysis, for example, of constituents or by constituents reacting with release of expansion gases). The dimensional stability or thermal stability of the composite particle resulting from the hardened droplet is, surprisingly, not adversely affected here.

Composite particles having a bulk density <700 g/L, preferably <400 g/L, more preferably <300 g/L combine the advantages of low bulk density, high insulation effect, and appropriate thermal stability; consequently, their use in the method of the invention is particularly preferred.

In many cases, preference is given to a method of the invention as described above (more particularly a method designated above or below as being preferred or preferable) wherein the composite particles resulting in step (a3) and/or the composite particles used in step (b) at least partially possess a particle size in the range from 0.125 mm to 0.5 mm, determined by sieving. Composite particles having a particle size of less than 0.5 mm generally possess particularly good pourability and can be processed particularly effectively to give a feeder element; producing them in step (a) of the method of the invention, and using them in step (b), are preferred.

Composite particles having a particle size of less than 0.125 mm are frequently not suitable especially for cold-box processes (cf. step (c) of the method of the invention) since when relatively small particles are used, the flow resistance during introduction of gases becomes too great. Moreover, at a correspondingly higher overall surface area of the particles, it is necessary to use more binder in step (b), something which is not advantageous. Preferably, therefore, at least 95 wt % of the composite particles produced in step (a), based on the total mass of the composite particles produced in step (a),
and/or
95 wt % of the composite particles used in step (b), based on the total mass of the composite particles used in step (b), have a particle size of 0.125 mm or more; this is so especially if in step (c) of the method of the invention, the shaping and curing of the feeder composition to give a feeder element take place in accordance with the cold-box process.

Preference is frequently also given to a method of the invention as described above (more particularly a method designated above or below as being preferred or preferable) wherein component (ii) comprises, as density-reducing substance or substances,
one or more expandants and the treating as per step (a3) is carried out such that the expandant or the two or more expandants expand and so form cavities in the resultant composite particle
and/or
comprises one or more pyrolysable fillers and the treating as per step (a3) is carried out such that the pyrolysable filler or the two or more pyrolysable fillers pyrolyse and so form cavities in the resultant composite particle.

When using expandants and/or pyrolysable fillers, the forming of cavities in step (a3) is a particular sub-aspect of the present invention, since in that way the bulk density of the resultant composite particles is decisively reduced and the insulating effect is increased. Quantity and particle size of the expandants and/or of the pyrolysable fillers are relevant parameters for the bulk density and the porosity of the resultant composite particles.

Preference is given to a method of the invention as described above (more particularly a method designated above or below as being preferred or preferable) wherein component (i) comprises, as refractory substances, one or more precursors of refractory solids and the treating as per step (a3) comprises a thermal treatment in which the precursors are converted into a refractory solid (this may be detected customarily by means of XRD measurement), wherein preferably the precursor or at least one of the precursors of refractory solids is a clay or clay-containing mineral and the treating as per step (a3) comprises a thermal treatment at a temperature in the range from 900 to 980° C., so that the clay is converted into a refractory solid, in which case the clay preferably comprises kaolinite and/or illite (this can be detected customarily by means of XRD measurement).

Examples of clay or of clay-containing mineral for use as precursors include kaolin and bentonite.

A particular service of the present patent application is that of having recognized that certain precursor materials (kaolins, e.g. "Chinafill 100" or "Kaolin TEC" from Amberger Kaolinwerke and "Kärlicher Blautonmehl" from Kärlicher Ton- and Schamottewerke Mannheim & Co.KG) on thermal treatment in step (a3) undergo transition even at comparatively low temperatures into a different phase possessing particular thermal stability and so contribute to even better thermal stability on the part of the composite particles produced in methods of the invention. When kaolin is used as precursor, the hardened droplet in step (a3) of the method of the invention is heated preferably to a temperature in the range from 900 to 980° C., so that, for example, kaolinite undergoes transition via intermediate phases to form the refractory solid mullite.

Figure 16:
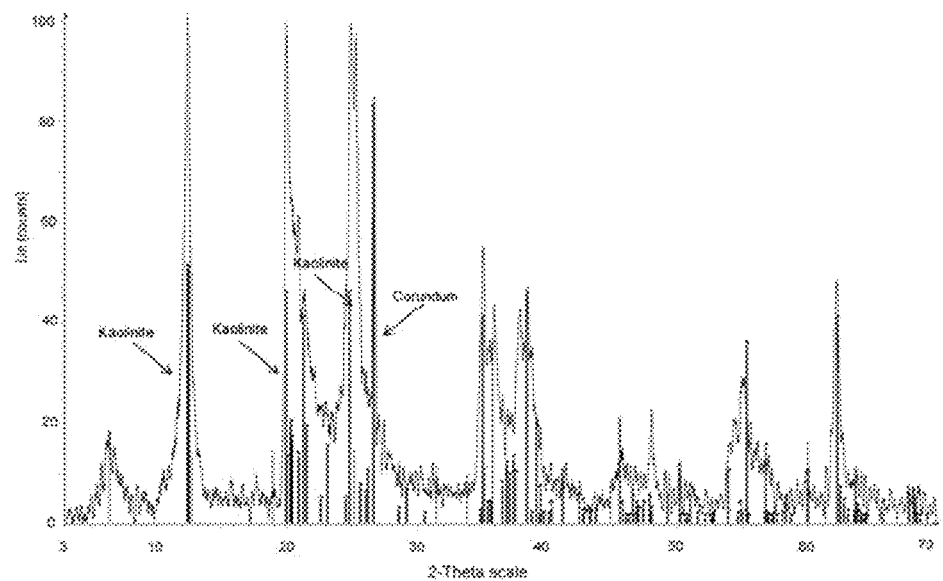
Figure 17:
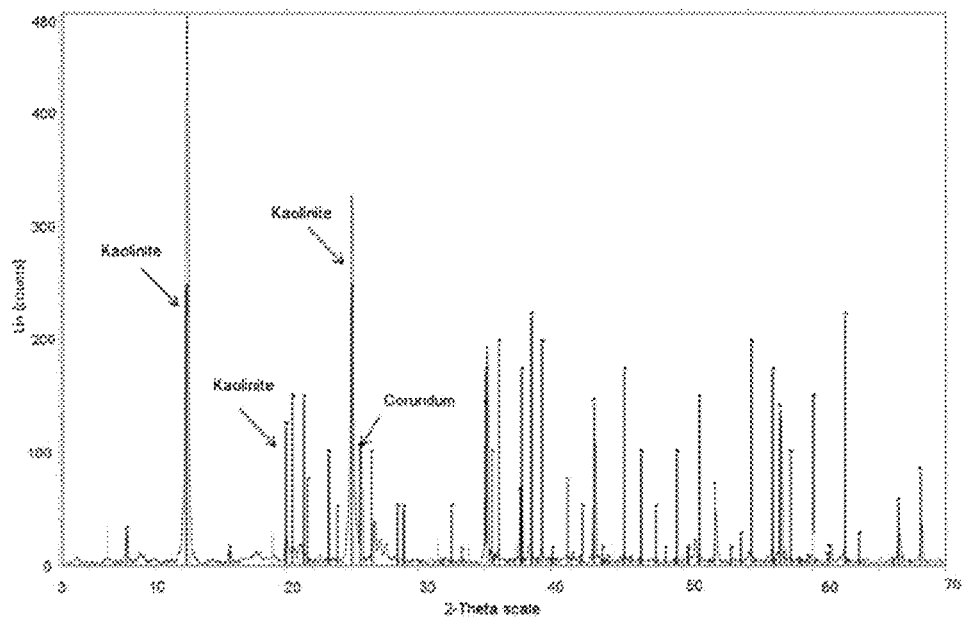
Figure 13:
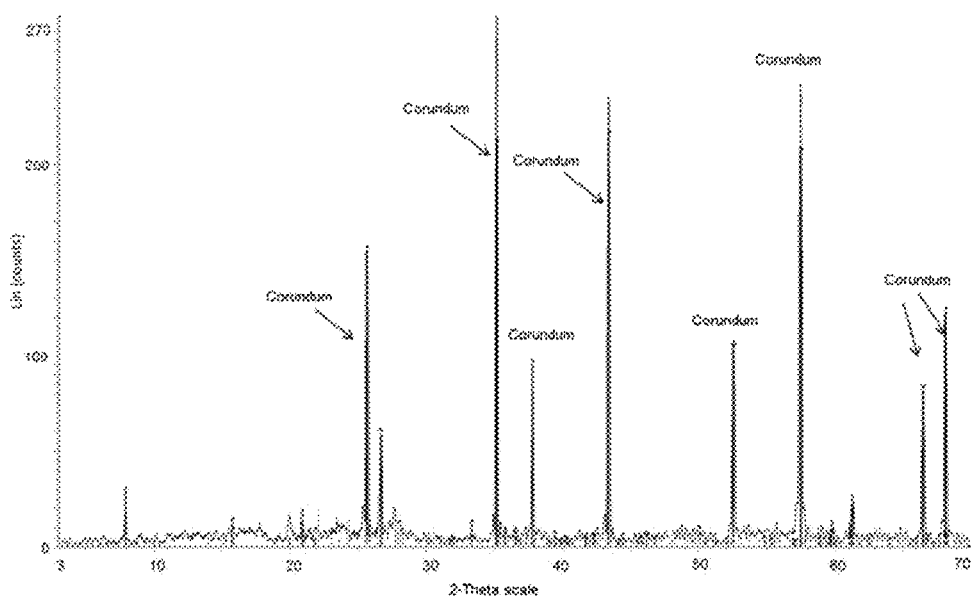

One example of a precursor of a refractory solid is kaolin (for a corresponding XRD of a kaolin, see FIG. 16). FIG. 17 shows an XRD of hardened droplets produced according to step (a2), after they have dried; the droplets contained kaolinite. The solidified and dried droplets were subsequently treated in accordance with step (a3) (sintering/heating at 900° C. or 980° C.), and an XRD was measured on the resultant composite particles after sintering/heating at 900° C. (cf. FIG. 18) and after sintering/heating at 980° C. (cf. FIG. 19).

The XRD before the treatment as per step (a3) differs significantly from the XRDs of the composite particles after the treatment as per step (a3). In particular, the reflections belonging to the kaolinite, at an angle of around 12°, 20° and 25° (2-theta), have disappeared entirely after sintering/heating at 900° C. (cf. FIG. 18) and after sintering at 980° C. (cf. FIG. 19).

Figure 19:
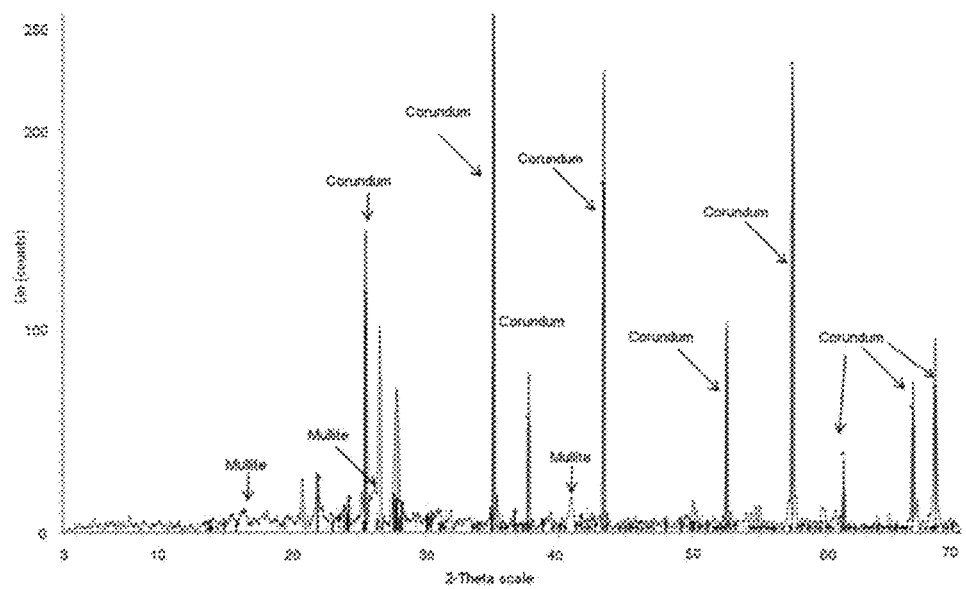

The XRD reflections marked in FIG. 19 with the word "mullite", which are present in contrast to FIG. 18 and FIG. 17, originate primarily from mullite which has formed from the thermal conversion of the kaolinite and has a very high thermal stability.

The use of precursors of refractory solids, especially the use of preferred precursors of refractory solids as described above, is a contributor, as is the direct use of refractory solids, to an increased thermal stability on the part of the composite particles produced in accordance with the invention.

Particularly preferred is a method as described above (more particularly a method designated above or below as being preferred or preferable) wherein preferably a temperature of 1000° C. is not exceeded during the thermal treatment.

In the construction of reactors which exceed treatment temperatures of 1000° C., special technical measures are needed. Accordingly, a thermal treatment at 980° C. or less is a contributor to a reduction in reactor complexity, and has a significantly lower energy requirement.

The thermal stability of the composite particles produced in accordance with the invention is especially surprising when it is compared with the thermal stability of the standard material represented by hollow-bead corundum. For the production of hollow-bead corundum, it is usual to produce a melt of aluminium oxide, which is then blown. In order to produce a melt of aluminium oxide, temperatures in the region of around 2000° C. are generally necessary in line with the melting temperature of $Al_2O_3$. Ceramic or glass-like hollow microbeads are produced for example in accordance with EP1832560 in temperature ranges of 1000-2000° C. Composite particles produced in accordance with the invention using suitable precursors possess enhanced thermal stability even after treatment at relatively low temperatures (sintering/heating; see above).

Preference is given to a method as described above (more particularly a method designated above or below as being preferred or preferable) wherein, in step (a3), the hardened droplets are washed and preferably the resulting washed droplets are dried. Following the washing (and optionally drying), further treatment steps are then carried out, preferably treatment steps as designated above as being preferred or preferable.

The composite particles produced in step (a) are preferably pourable; employed in step (b) are preferably pourable composite particles produced in step (a), or a pourable fraction of composite particles produced in step (a).

Preference is given to a method as described above (more particularly a method designated above or below as being preferred or preferable) wherein in step (a3) the hardened droplets are treated so that, as an intermediate, solid particles result, and wherein subsequently the surface of these solid particles is sealed, preferably by means of an organic coating material, so that the said composite particles result. In the specific case, the use of an inorganic coating material is advantageous.

In the production of feeder elements by the method of the invention, and therefore using composite particles produced inventively, the in many cases high porosity of the said composite particles results frequently in increased consumption of binders; particularly when using organic binders, this is undesirable. It results on the one hand in increased costs and, moreover, to increased emissions during casting. In order to reduce the binder consumption and the corresponding costs, it is advantageous to seal the surface of the said composite particles and so to prevent injudicious penetration of the binder into the pores.

Preference is given to a method as described above (more particularly a method designated above or below as being preferred or preferable) wherein in step (b) an organic binder is used as binder, preferably a cold-box binder, and wherein in step (c) the curing takes place by the cold-box method by gassing with an organic amine.

One particularly preferred organic coating material is albumen, which is applied preferably in the form of an aqueous solution.

An aqueous albumen solution is produced preferably by mixing an egg white powder with water. Corresponding albumen solutions are produced for example with:

Standard egg white powder (product number 150061) from NOVENTUM Foods,

High Whip egg white powder (product number 150062) from NOVENTUM Foods and

High Gel egg white powder (product number 150063) from NOVENTUM Foods.

Since the said composite particles, as described above, in some cases are of high porosity, it is particularly advantageous to seal them with one of the preferred coating materials. The preferred coating materials as described above are readily available on the market, are non-toxic and are easy to process.

Albumen as an organic coating material is particularly preferred because it seals the surface of the composite particles outstandingly and thereby advantageously reduces their capacity to absorb binder.

Particularly preferred is a method as described above (more particularly a method designated above or below as being preferred or preferable) wherein, in step (b), one or more further constituents are used which are selected from the group consisting of spheres of fly ash, rice husk ash, core-shell particles (preferably in accordance with the disclosure content in EP 2 139 626 B1), calcined kieselguhr, aluminium, magnesium, silicon, iron oxide, manganese oxide, silicon dioxide (e.g. in the form of silica sand), chamotte, mullite, potassium nitrate and sodium nitrate. Especially preferred in this context is a method of the invention wherein the total amount of the further constituents from the stated group that are used in step (b) is in the range from 1 to 90 wt %, more preferably in the range from 5 to 70 wt %, especially preferably in the range from 10 to 50 wt %, based on the total mass of the feeder composition produced in step (b).

A method of the invention for producing an exothermic feeder element for the foundry industry comprises preferably in step (b) the mixing of the composite particles produced in step (a) or of a fraction of these composite particles with a binder and also with a metal selected from the group consisting of aluminium, magnesium and silicon and/or an oxidizing agent selected from the group consisting of iron oxide, potassium nitrate and sodium nitrate, and also optionally with further constituents, to give a feeder composition.

The invention also relates to a feeder element producible by a method as described above (more particularly by a method designated above or below as being preferred or preferable). A feeder element of the invention comprises composite particles as described above. When a feeder element of the invention is produced, according to one preferred method of the invention, specific characteristics and typical product properties come about (with regard for example to the physical composition and the thermal stability, the insulation effect, and the low feeder weight).

The invention also relates to the use of a matrix encapsulation process, preferably using a nozzle, more preferably using a vibrating nozzle, for producing composite particles having a bulk density <700 g/L, preferably <400 g/L, more preferably <300 g/L, in the production of feeder elements for the foundry industry.

This aspect of the invention is based on the surprising finding that the use of composite particles prepared accordingly, having a bulk density of <700 g/L, preferably <400 g/L, more preferably <300 g/L, produces very lightweight, highly insulating feeder elements having preferably high thermal stability. With regard to preferred embodiments of such a use, the explanations provided for the method of the invention are valid correspondingly.

The invention further relates to the use of sealed composite particles consisting of a composite particle, which can be produced by means of a matrix encapsulation process, and of a shell, which surrounds and seals the composite particle and consists of an organic coating material (e.g. albumen; see above) as filler in a feeder element, preferably in a feeder element produced by means of the cold-box process.

The use of corresponding sealed composite particles in a cold-box process has the advantage that less binder need be used and that the binder that is used is also more effectively available for subsequent gassing with amines; reference may be made to the observations above.

With regard to preferred embodiments of a use in accordance with the invention, the explanations given for the method of the invention are valid correspondingly.

The present invention also relates to a method for producing refractory (preferably highly refractory) composite particles having a particle size of less than 2 mm, determined by sieving, comprising the following steps:
 (a1) producing droplets of a suspension from at least the following starting materials:
  (i) one or more refractory substances selected from the group consisting of
   refractory solids and precursors of refractory solids,
  (ii) one or more density-reducing substances selected from the group consisting of
   lightweight fillers having a respective bulk density in the range from 10 to 350 g/L, expandants and pyrolysable fillers,
  (iii) as continuous phase, a solidifiable liquid,
 (a2) solidifying the solidifiable liquid, so that the droplets harden to hardened droplets and the refractory substance or substances and also the density-reducing substance or substances are encapsulated in the solidifying continuous phase,
 (a3) treating the hardened droplets, so that the said refractory composite particles result.

The invention correspondingly also relates to the application of this method of the invention in a method of the invention for producing a feeder element for the foundry industry; the above observations concerning the method of the invention for producing a feeder element for the foundry industry are valid accordingly for the method of the invention for producing refractory composite particles.

The invention also relates, moreover, to the use of refractory (preferably highly refractory) composite particles which are producible or have been produced by the method of the invention for producing refractory composite particles having a particle size of less than 2 mm, determined by sieving, as constituent of a feeder element. The above observations concerning the method of the invention for producing a feeder element for the foundry industry are valid accordingly for the inventive use of refractory composite particles (which are preferably stable thermally at 1700° C.). Preferred is the inventive use of refractory composite particles (preferably composite particles which are stable thermally at 1700° C.) having a bulk density <700 g/L, preferably <400 g/L, more preferably <300 g/L.

The present invention is elucidated in more detail below with reference to the figures and by examples.

FIGURES

FIG. 1: FIG. 1 shows the residue in the crucible after the sintering test at 1600° C. of the inventive composite particles B36.

As can be seen in FIG. 1, a small proportion of the inventive composite particles has sintered together, but at the same time there is still a considerable proportion present in a free-flowable form.

Figure 2:
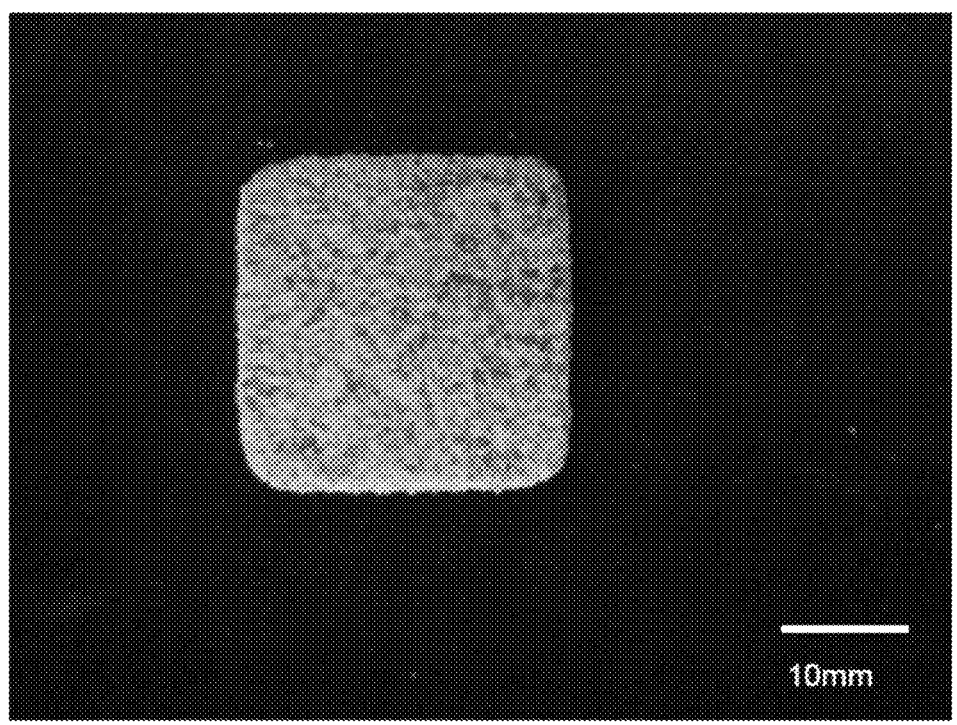

FIG. 2: FIG. 2 shows the crucible residue after the sintering test at 1600° C. of the non-inventive composite particles W250-6.

As is seen in FIG. 2, the crucible residue has sintered together, forming a coherent "crucible cake".

Figure 3:
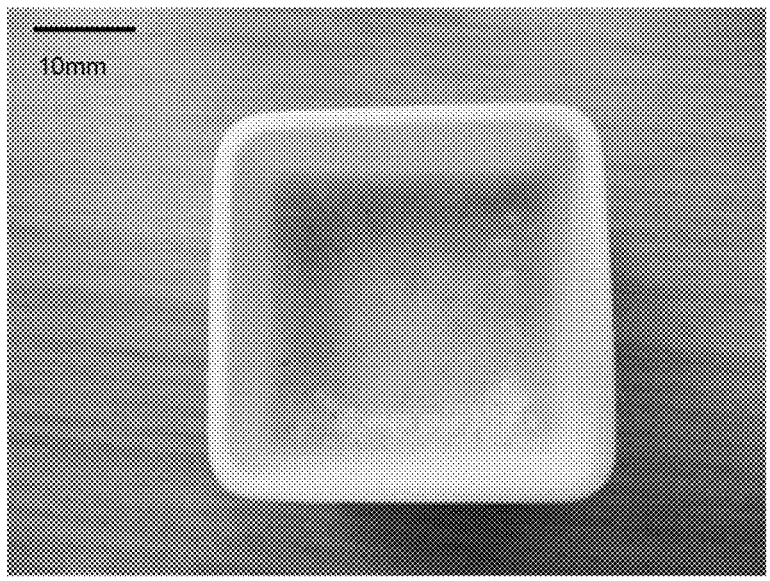

FIG. 3: FIG. 3 shows a photograph of the crucible contents after the sintering test at 1600° C. of the non-inventive composite particles KHP 108.

As can clearly be seen, the contents of the crucible have fused to give a continuous mass.

Figure 4:
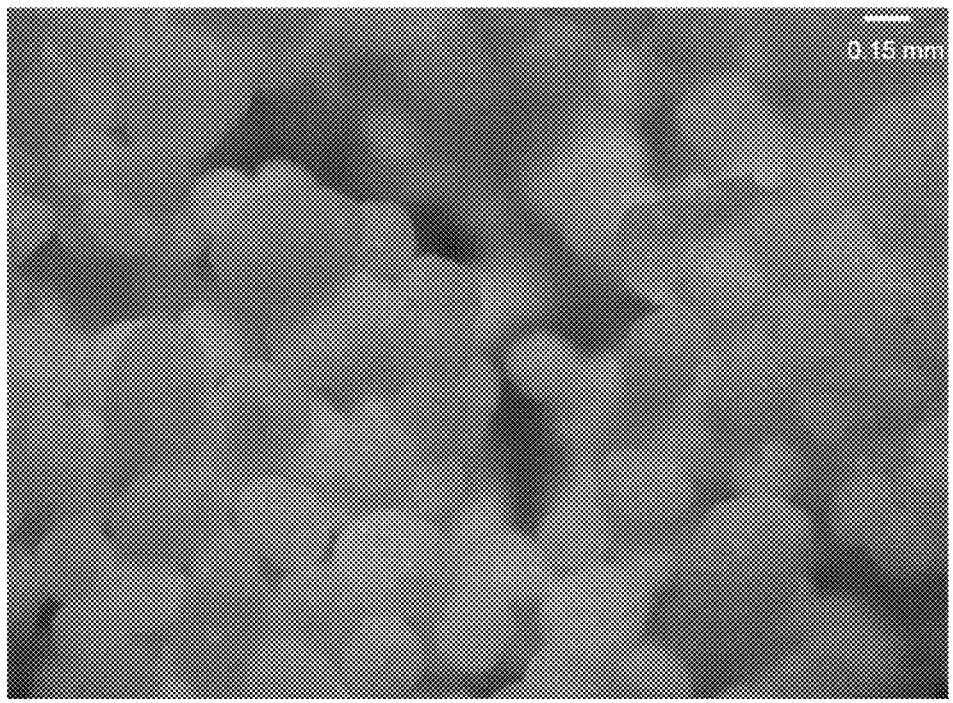

FIG. 4: FIG. 4 shows a micrograph of the inventive composite particles B36 after the sintering test at 1600° C.

As can be seen very well, the inventive composite particles after the sintering test have not as yet formed sinter necks.

Figure 5:
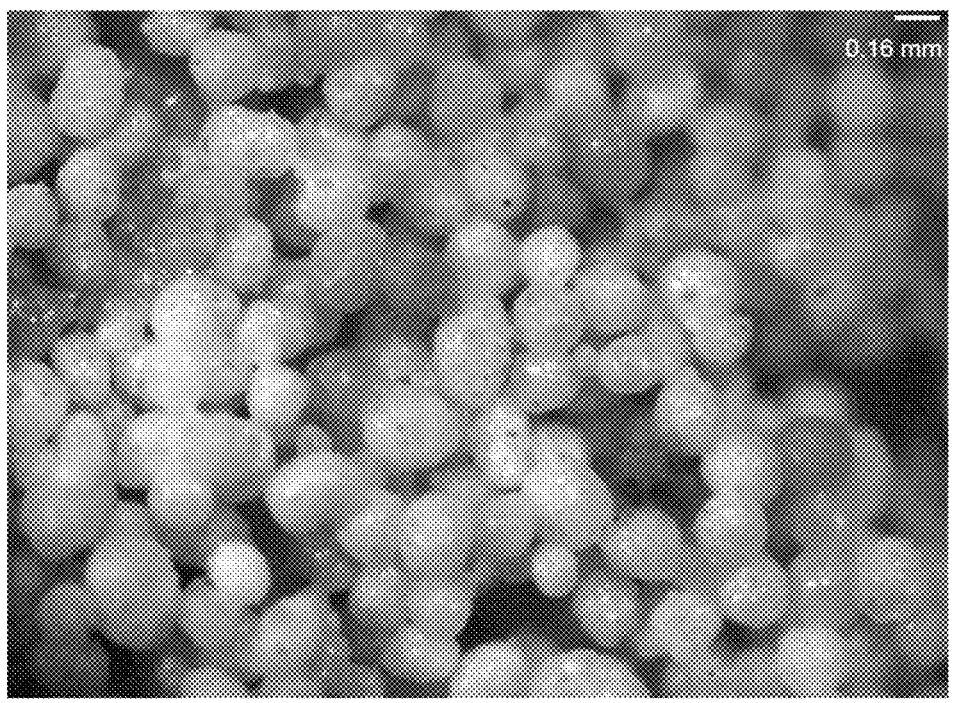

FIG. 5: FIG. 5 shows a micrograph of the non-inventive composite particles W250-6 after the sintering test at 1600° C.

As can clearly be seen, sinter necks have formed between the non-inventive composite particles and the entire non-inventive composite particles have therefore joined together is to form a coherent "crucible cake".

Figure 6:
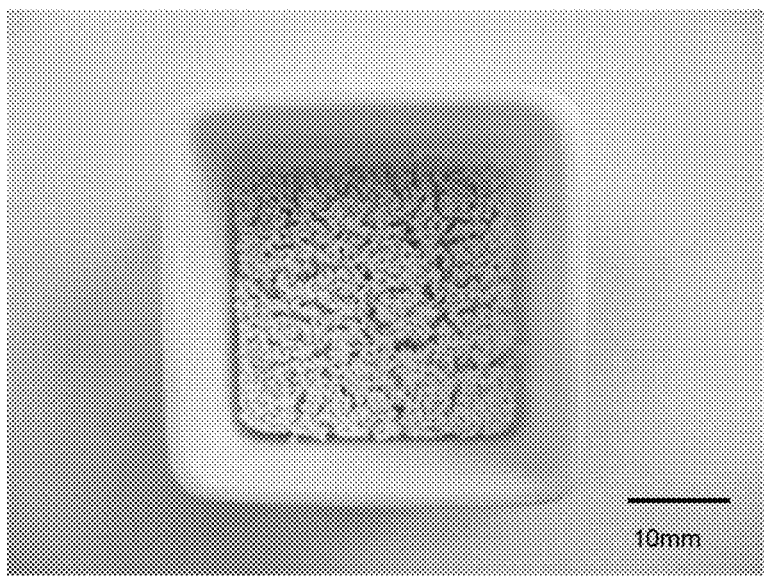

FIG. 6: FIG. 6 shows the residue in the crucible after the sintering test at 1700° C. of the inventive composite particles B36.

A small proportion of the inventive composite particles have sintered together. However, a considerable proportion is still in a free-flowable form.

Figure 7:
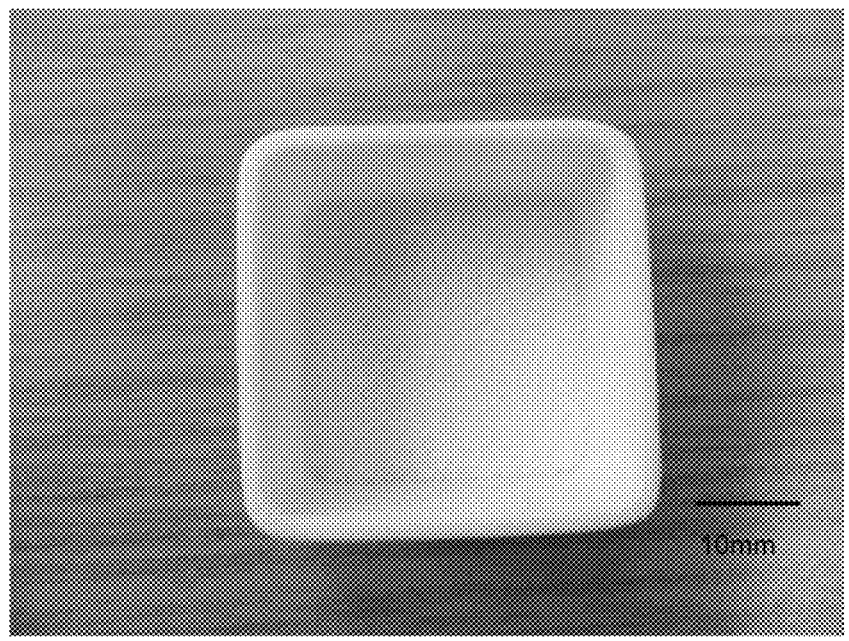

FIG. 7: FIG. 7 shows the crucible residue after the sintering test at 1700° C. of the non-inventive "Hargreaves" hollow-bead corundum composite particles.

It can be seen that the entire non-inventive composite particles have joined together to form a coherent "crucible cake".

Figure 8:
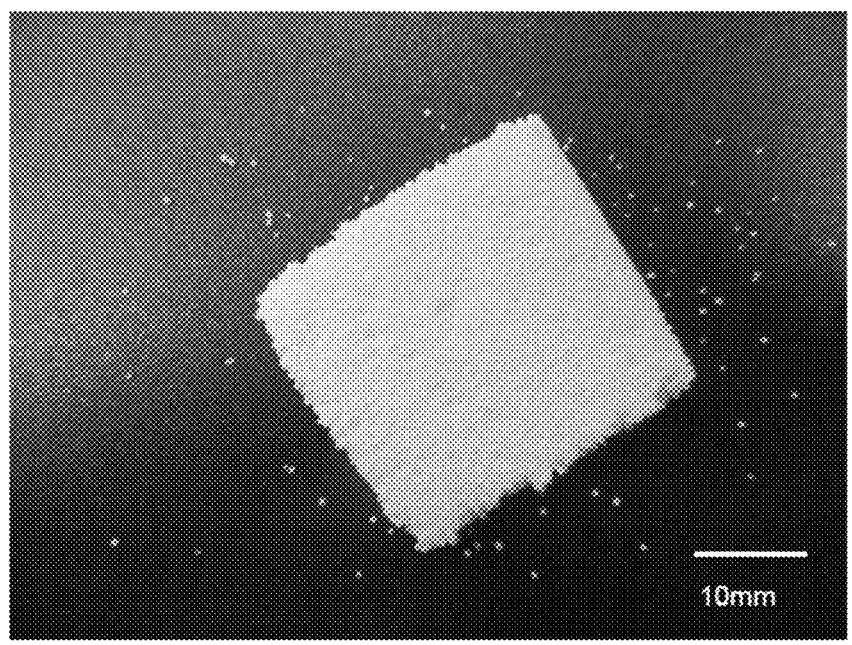

FIG. 8: FIG. 8 shows the crucible residue after the sintering test at 1700° C. of the non-inventive "KKW" hollow-bead corundum composite particles.

As can clearly be seen, the entire non-inventive composite particles have joined together to form a coherent "crucible cake".

Figure 9:
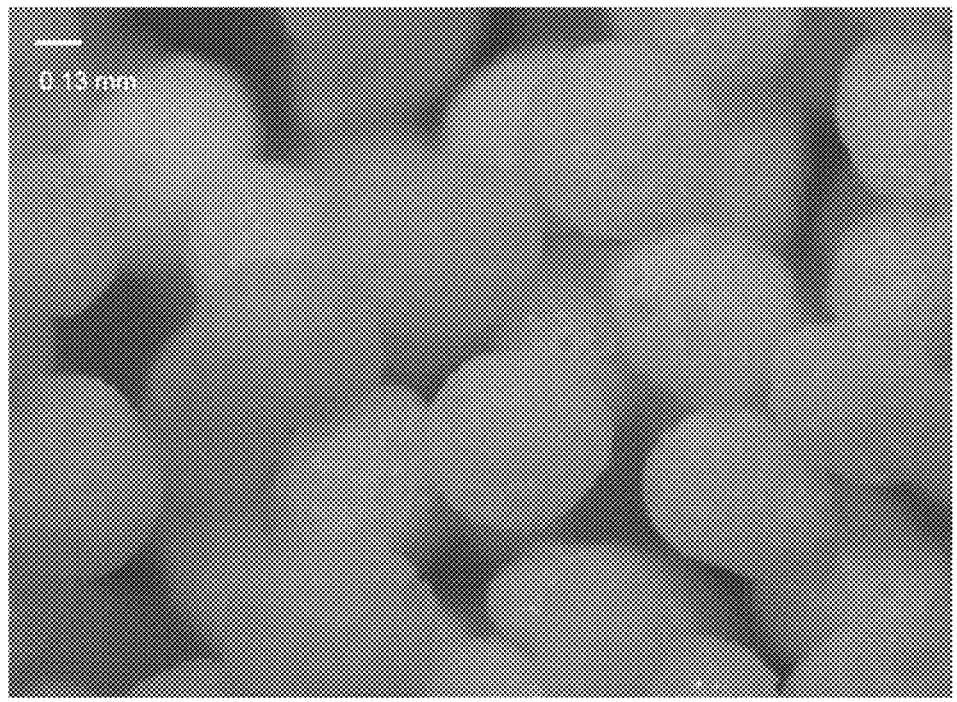

FIG. 9: FIG. 9 shows a scanning electron micrograph of the inventive composite particles B36 after the sintering test at 1700° C.

As can be seen very well, the inventive composite particles after the sintering test have not as yet formed sinter necks.

Figure 10:
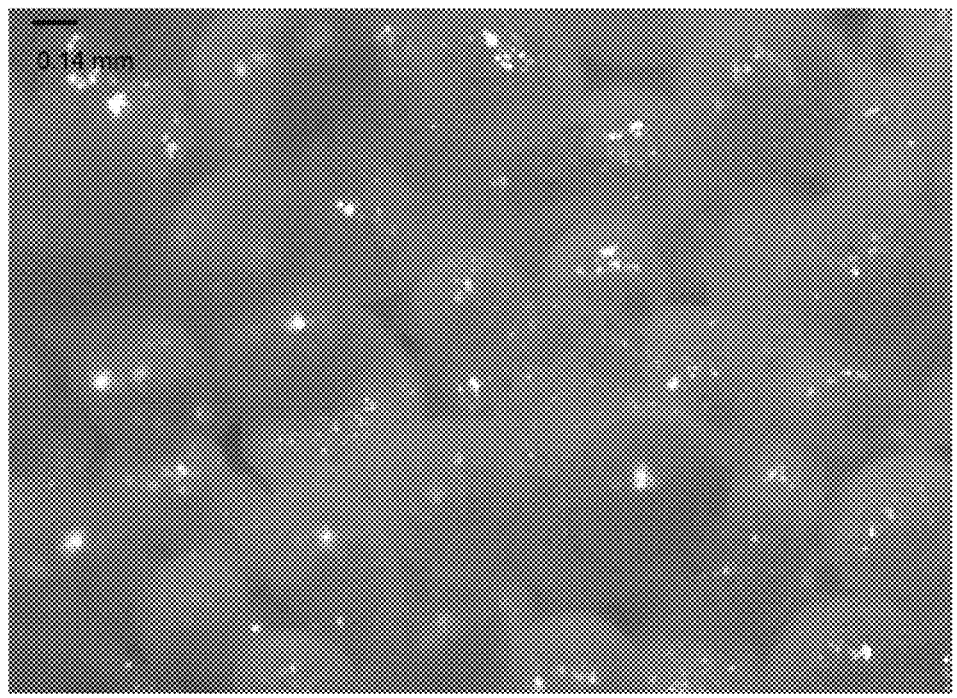

FIG. 10: FIG. 10 shows a micrograph of the non-inventive "Hargreaves" hollow-bead corundum composite particles after the sintering test at 1700° C.

The particles have undergone superficial melting during the sintering test, causing all of the non-inventive composite particles to join together during solidification to form a coherent "crucible cake".

Figure 11:
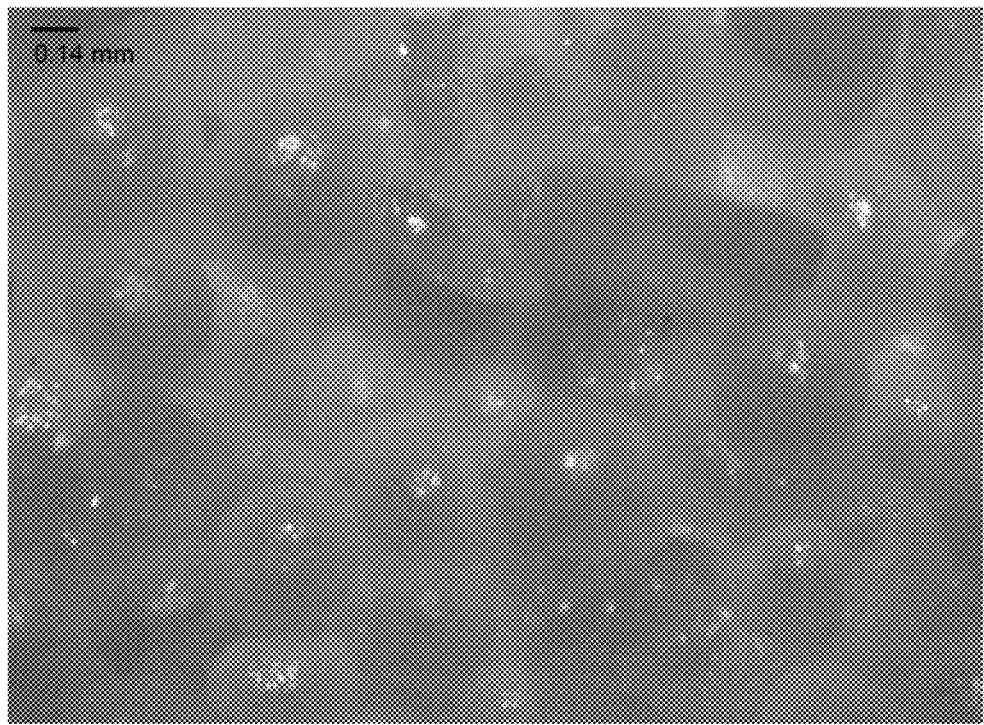

FIG. 11: FIG. 11 shows an enlarged micrograph of FIG. 10 of the non-inventive "KKW" hollow-bead corundum composite particles after the sintering test at 1700° C.

The particles have undergone superficial melting during the sintering test, causing all of the non-inventive composite particles to join together during solidification to form a coherent "crucible cake".

Figure 12:
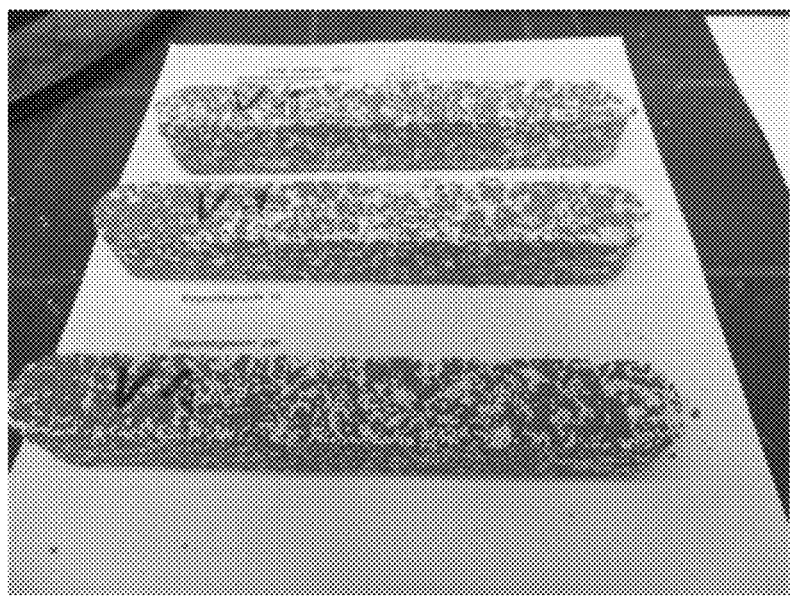

FIG. 12: FIG. 12 shows an inventive test bar produced with composite particles "B36-albumen" whose surface has been sealed.

Figure 13:
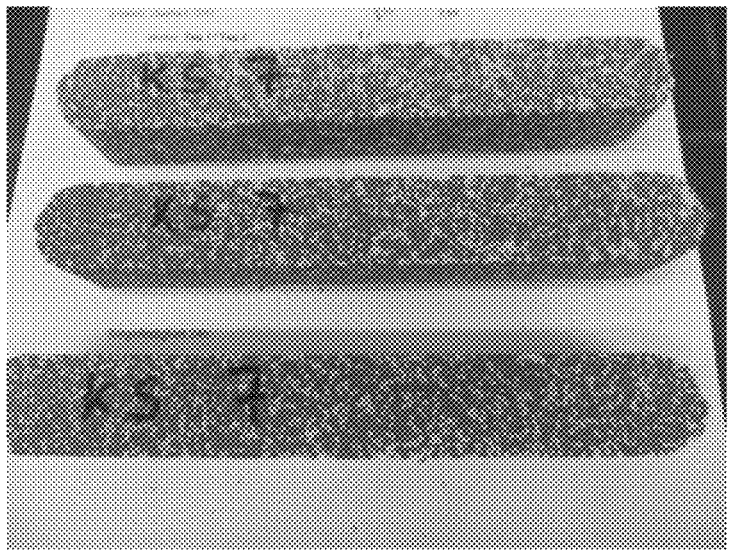

FIG. 13: FIG. 13 shows inventive test bars produced by means of composite particles B36 (no surface sealing).

Figure 14:

FIG. 14: FIG. 14 shows two half-sections of an iron casting produced in a "cube" test with non-inventive feeder elements.

Figure 15:
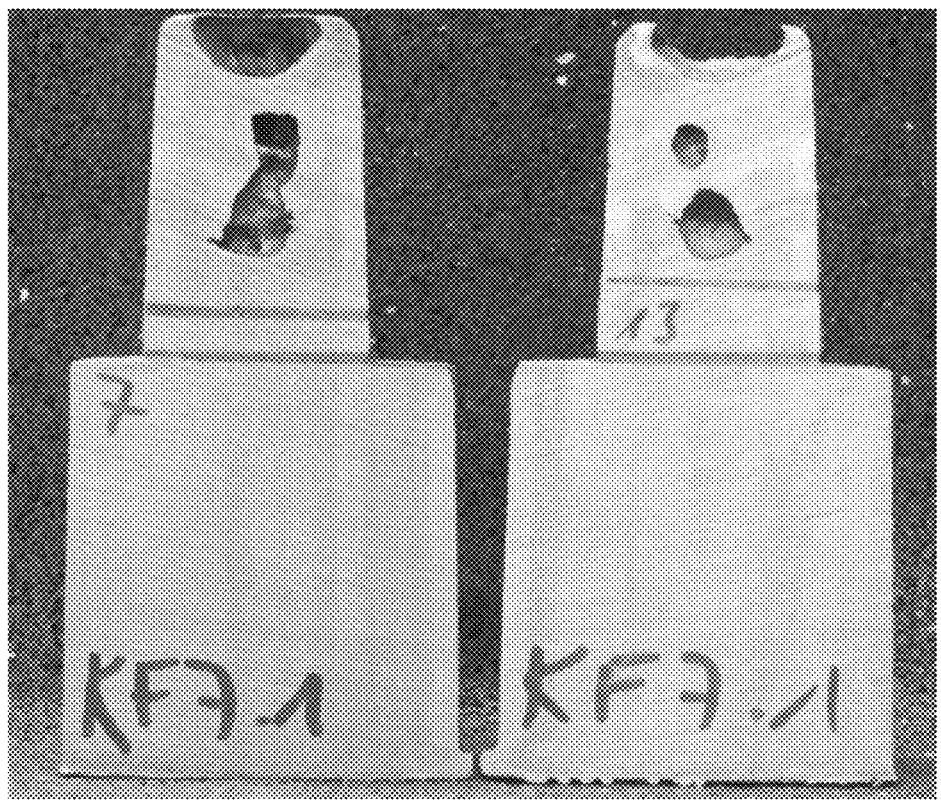

FIG. 15: FIG. 15 shows two half-sections of an iron casting produced in a "cube" test with inventive feeder elements.

FIG. 16: FIG. 16 shows an XRD of a kaolin. The Y-axis shows the counts of the measurement (corresponding to the intensity of the reflections) and the X-axis shows the angle in the 2-THETA scale.

The major reflections of kaolinite are easily visible at an angle of around 12° 2-theta, 20° 2-theta and 25° 2-theta.

FIG. 17: FIG. 17 shows an XRD of the hardened droplets produced in step (a2) after they have dried. Visible on the Y-axis are the counts of the measurement (corresponding to the intensity of the reflections) and on the X-axis the angle in the 2-THETA scale.

Here again, the principal reflections of the kaolinite are readily visible at an angle of around 12° 2-theta, 20° 2-theta and 25° 2-theta. Additionally, corundum, added as refractory filler, is detected.

FIG. 18: FIG. 18 shows an XRD of the inventively produced composite particles after sintering at 900° C. Visible on the Y-axis are the counts of the measurement (corresponding to the intensity of the reflections) and on the X-axis the angle in the 2-THETA scale.

It can easily be seen that after sintering at 900° C., the reflections of the kaolinite are no longer visible. The main phase detected is corundum, which was added as a refractory filler.

FIG. 19: FIG. 19 shows an XRD of the inventively produced composite particles after sintering at 980° C. Visible on the Y-axis are the counts of the measurement (corresponding to the intensity of the reflections) and on the X-axis the angle in the 2-THETA scale.

After sintering at 980° C., it is not possible to detect any reflections of the kaolinite; instead, the newly formed mullite phase (peaks at 16.5° 2-theta; 26° 2-theta and 41° 2-theta) is detected by x-ray diffraction. Also detected is corundum, which was added as a refractory filler.

Figure 20:
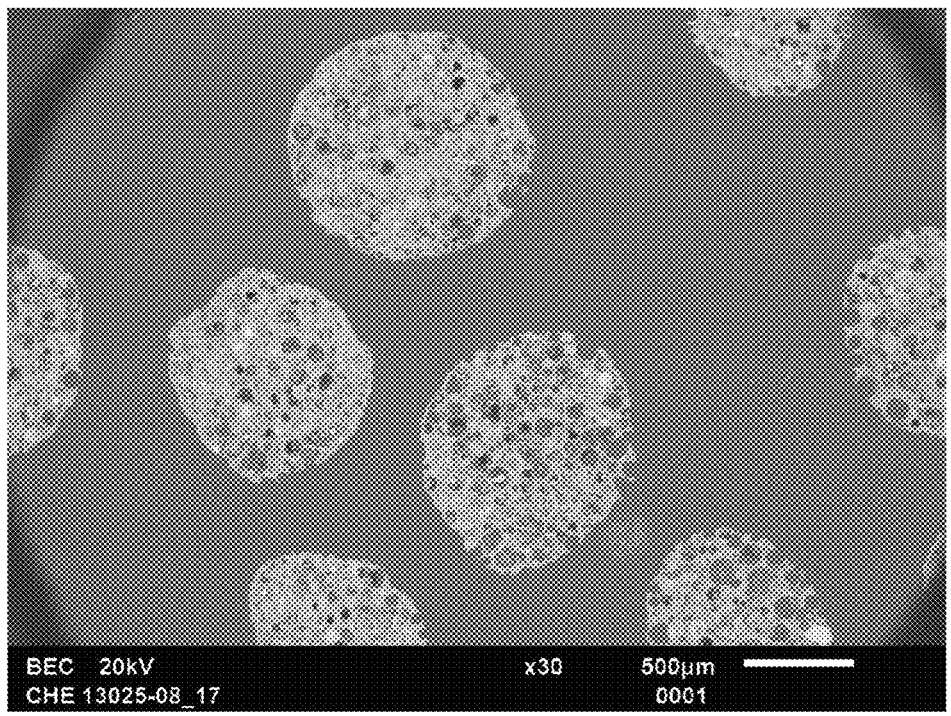

FIG. 20: FIG. 20 shows a scanning electron micrograph of the inventively produced composite particles with the designation "B36" (see examples further on below in the text).

Figure 21:
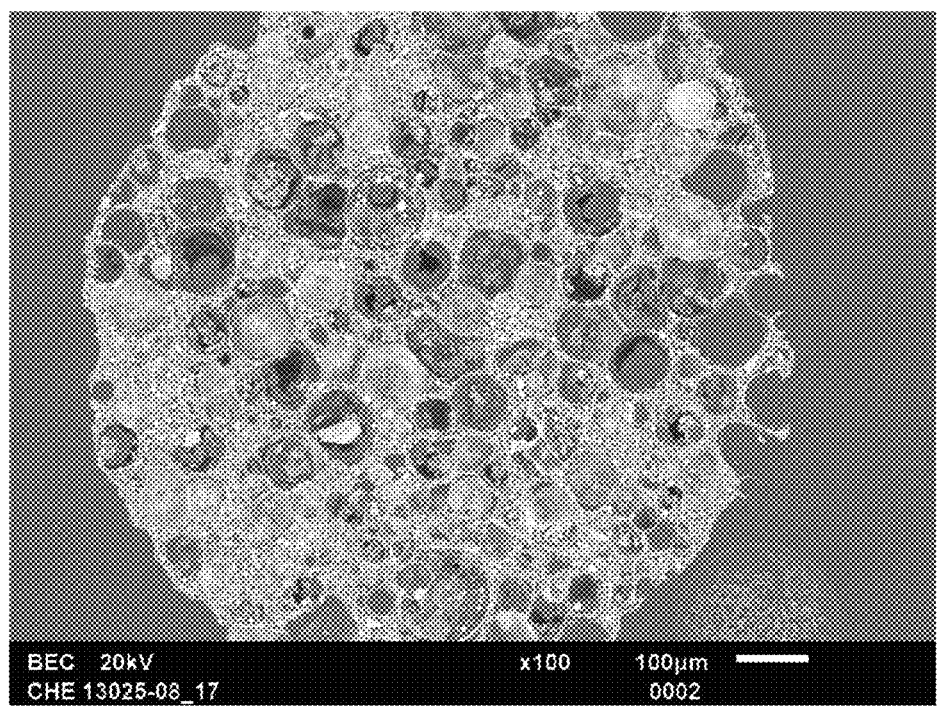

FIG. 21: FIG. 21 shows an enlarged scanning electron micrograph of the inventively produced composite particles with the designation "B36" (see examples further on below in the text).

It is very readily apparent that the various refractory fillers are surrounded individually by the continuous phase and are therefore held together more firmly, giving the inventively produced composite particles the desired dimensional stability and desired thermal stability.

Figure 22:
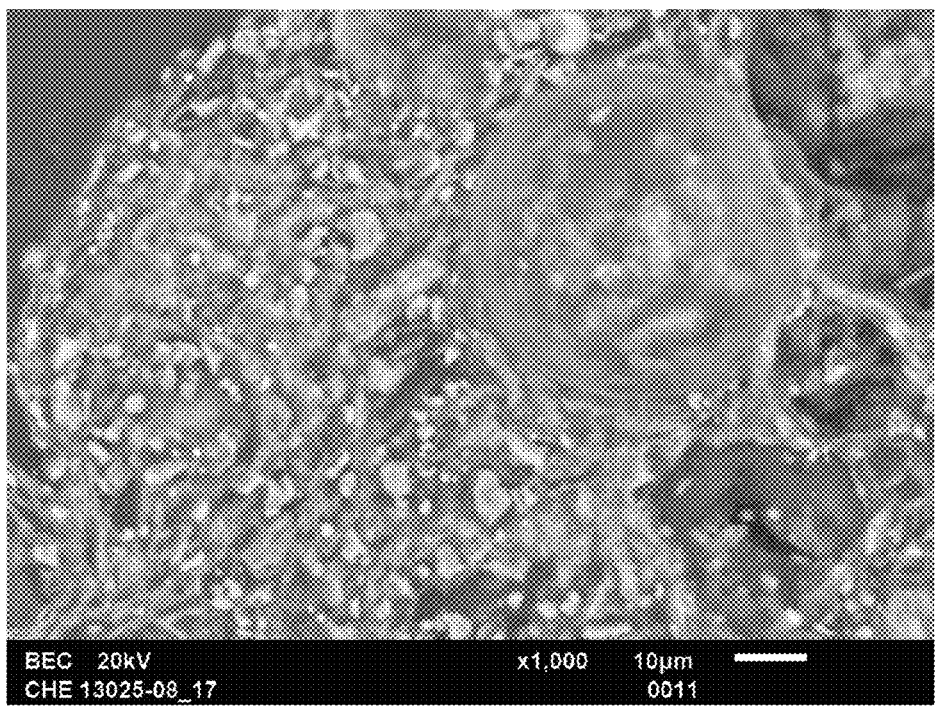

FIG. 22: FIG. 22 shows a greatly enlarged scanning electron micrograph of the inventively produced composite particles "B36".

Figure 23:
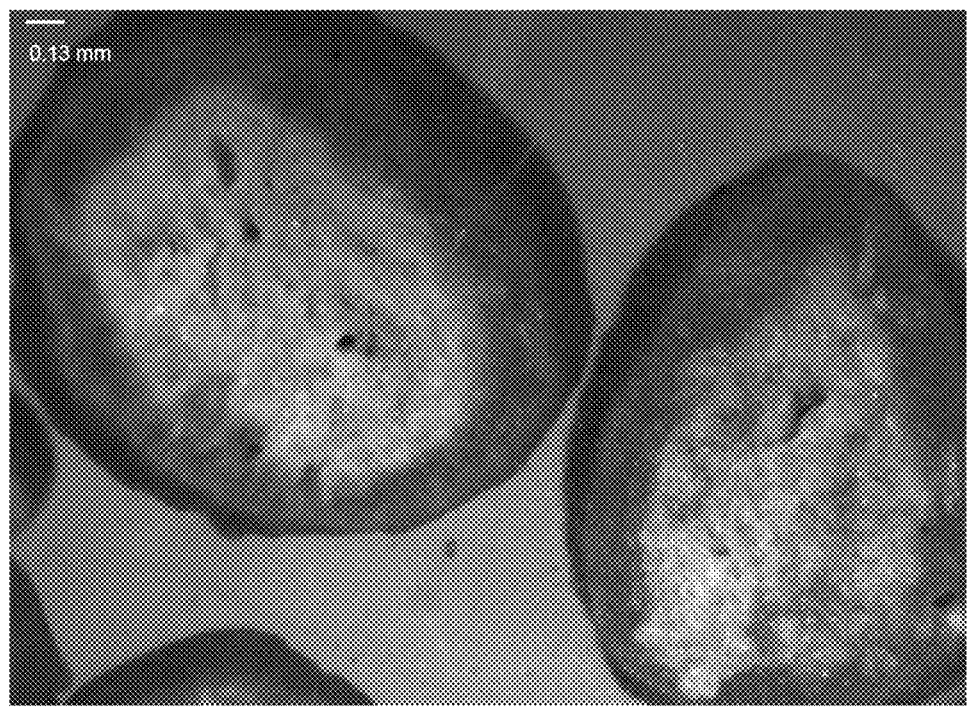

FIG. 23: FIG. 23 shows a light micrograph of the inventively produced composite particles with the designation "F3" (see Table 1 further on below in the text) immediately prior to treatment in a muffle furnace.

It can be seen very well that the particles immediately prior to treatment in the muffle furnace are very compact and have only sporadic cavities.

Figure 24:
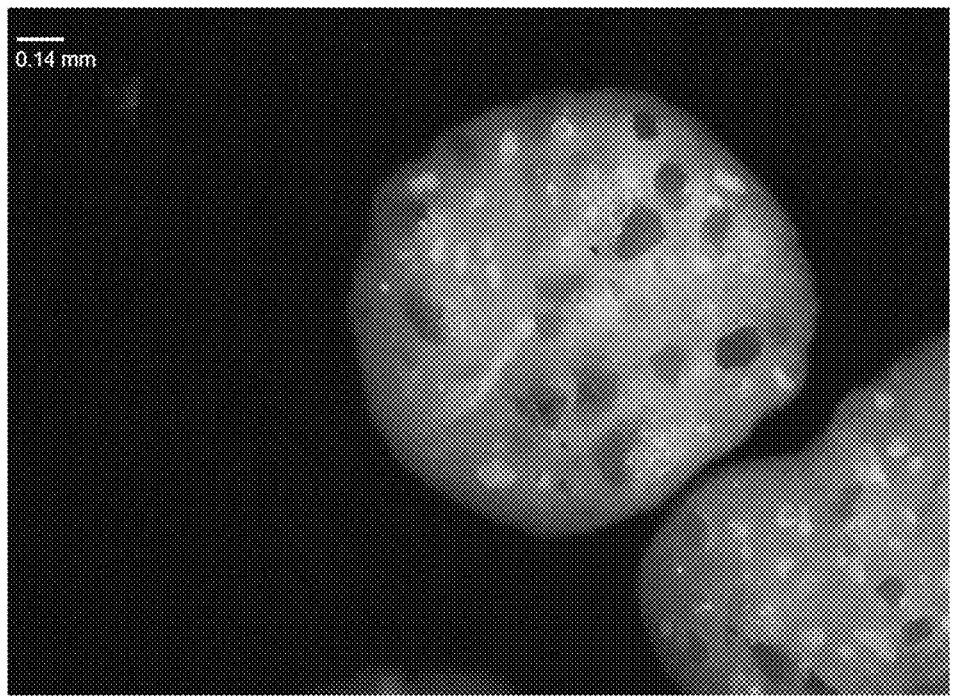

FIG. 24: FIG. 24 shows a light micrograph of the inventively produced composite particles with the designation "F3" (see Table 1 further on below in the text) after treatment in a muffle furnace.

It can be seen very well that the particles after treatment in the muffle furnace have a considerable number of cavities, formed by the expanding of the utilized expandant during the thermal treatment.

In the text below, the present invention is elucidated in more detail with examples:

Measurement Methods:

1. Particle Size Determination:

The determination of the particle sizes of composite particles by sieving takes place in accordance with DIN 66165-2 (4.1987) using method F identified therein (machine sieving with agitated individual sieve or sieve set in gaseous fluid at rest).

A Retsch AS 200 control vibrational sieving machine is used; the amplitude is set to level 2, there is no interval sieving, and the sieving time is 1 minute.

The determination of particle sizes of lightweight fillers used in step (a) as density-reducing substance of component (ii) takes place likewise in accordance with DIN 66165-2 (4.1987) using method F identified therein (machine sieving with agitated individual sieve or sieve set in gaseous fluid at rest). Again, a Retsch AS 200 control vibrational sieving machine is used; the amplitude is set to level 2, there is no interval sieving, and the sieving time is 1 minute.

The determination of the particle sizes of refractory solids having a particle size of less than 0.1 mm takes place by means of sieving in accordance with DIN 66165-2 (4.1987) using method D specified therein (machine sieving with resting individual sieve in agitated gaseous fluid, with air jet sieve).

2. Determination of Bulk Density:

The bulk density was determined according to DIN EN ISO 60 2000-1.

3. Determination of Water Absorptiveness:

The determination of the water absorption was carried out using an Enslin instrument. Evaluation took place in accordance with DIN 18132.

4. Determination of Phase Composition:

The powder diffractograms were recorded using a Siemens D 5005 powder diffractometer with a copper anode. The measurements took place in the diffraction angle range 3-70° 2-theta; step width 0.020°; counting time 4 steps/sec. Evaluation was made using the EVA standard software and ICDD PC-PDF database.

5. Determination of Chemical Composition and Morphology:

The morphology of the samples was carried out by means of a JSM 6510 SEM from Jeol. The chemical composition was carried out by means of EDX analysis using an EDX from Oxford INCA.

Additionally, for the determination of the morphology, a VisiScope ZTL 350 light microscope with Visicam 3.0 camera was utilized.

6. Method for Determining the Thermal Stability (Sintering Test):

The sintering test in the present invention was carried out for determining the thermal stability of various raw materials along the lines of the VDG datasheet P26 "Testing of moulding base materials". A quantity of particles of the same composition, for analysis, was subjected to defined thermal treatment (for example 1600° C. or 1700° C. for half an hour in each case) in a Carbolite HTF 1800 oven with a type E 3216 temperature control, and then evaluated by way of defined mechanical loading, by means of sieving.

First of all, the quantity of particles under investigation was sieved using a sieve of mesh size 0.5 mm—see Table 2 below—or of 0.71 mm—see Table 3 below—in order to ensure the reproducibility and comparability of the various experiments.

The sieved particles were subsequently subjected to defined thermal treatment in an aluminium oxide crucible, with the following steps:

preliminary sintering of the samples, 30 min at 900° C. in the preheated oven, to ensure identical thermal loading for the comparative samples as for the inventive composite particles, heating of the samples with defined oven transit (Carbolite HTF 1800 oven with type E3216 temperature control): from 25° C. to 200° C. at 1 K/min, subsequently at 3 K/min until the end temperature (1600° C. for half an hour—see Table 2 below—or 1700° C. for half an hour—see Table 3 below) and subsequent cooling to room temperature at 3 K/min.

Thereafter the cooled particles were photographed with aluminium oxide crucible (see FIG. 3 (particles fused), FIG. 6 and FIG. 7) or without aluminium oxide crucible (see FIG. 1, FIG. 2 and FIG. 8) and, where the particles under investigation have not melted during the defined thermal treatment, the aluminium oxide crucible in which the particles under investigation were heated was clamped into a sieving tower and subjected to mechanical stress by defined sieving with a control sieve on a Retsch AS 200 for 1 minute in each case at an amplitude of 2 without interval sieving, i.e. with permanent sieving. The mesh size of the control sieve was set at the maximum anticipated particle size of the particles under investigation (either 0.5 mm—see Table 2 below—or 0.71 mm—see Table 3 below). The ratio of sieve residue to sieve undersize is employed as an evaluation criterion (cf. VDG datasheet P26 "Testing of moulding base materials", October 1999). At a factor of sieve residue/sieve undersize of greater than 1, the sample is considered to have undergone sintering and therefore not to have thermal stability.

Sample-specific parameters such as the particle size of the respective sample, for example, were taken into account in the evaluation.

Experimental Section (Parts 1 to 3):

Experimental Part 1—Production According to Step (a) of the Method of the Invention of Composite Particles (B36, B37, B31) Having a Particle Size of Less than 2 mm (Also Referred to Below as "Inventive Composite Particles"):

(a1) Production of Droplets of a Suspension from Starting Materials:

A 1% strength aqueous sodium alginate solution was prepared (1 wt % sodium alginate from Alpichem with CAS No. 9005-38-3, based on the total mass of the aqueous solution).

The dispersant Sokalan® FTCP 5 from BASF was diluted with water to produce a corresponding dispersing solution; the ratio by mass of Sokalan® FTCP 5 to water was 1:2.

The 1% strength aqueous sodium alginate solution prepared and the dispersing solution prepared were subsequently mixed in a mixing ratio as per Table 1, to give a solidifiable liquid (solidifiable liquid for use as continuous phase as constituent (iii) as per step (a1)).

Then, with stirring, precursors of refractory solids and refractory solids selected in accordance with Table 1 below (constituent (i) according to step (a1)) were added to the solidifiable liquid until a creamy suspension was formed.

Subsequently, with stirring, borosilicate beads were added to the creamy suspension, in a quantity according to Table 1 below as an example of a lightweight filler (constituent (ii) as per step (a1)), followed subsequently by an amount of water as per Table 1. This resulted in a dilute suspension.

TABLE 1

Ingredients for producing composite particles of the invention and resultant bulk density thereof.

| Starting material | | Ingredients | | Composition of the suspension (weight fractions) | | | | |
|---|---|---|---|---|---|---|---|---|
| | | Constituent | Manufacturer | | | | | |
| Precursor of refractory solids [wt %] | (i) | Kaolin TEC | Amberger Kaolinwerke | 11.00 | 10.0 | 11.0 | 10.0 | 15.0 |
| | (i) | Kärlicher Blauton | Kärlicher Tonund Schamottewerke Mannheim & Co. KG | 5.00 | 5.00 | 5.00 | 5.00 | 5.00 |
| | (i) | Kaolin (Satintone ®W(Whitetex)) | BASF | — | — | 10.85 | 10.0 | — |
| Refractory substance [wt %] | (i) | Nabalox ® NO315 | Nabaltec AG | 10.85 | 10.0 | — | — | — |
| Light-weight filler [wt %] | (ii) | Borosilicate glass beads (product name: 3M Glass Bubbles K1) with a bulk density of 60 g/L | 3M Deutschland GmbH | 3.15 | 5.00 | 3.15 | — | — |
| Light-weight filler [wt %] | (ii) | Expanded perlite (product name: Eurocell 140) with a bulk density of 120 g/L | RS Rohstoff-Sourcing GmbH | — | — | — | — | 8.00 |
| Expandant [wt %] | (ii) | Wood flour Ligno-Tech 120 mesh TR with a bulk density of 110 g/L | Brandenburg Holzmühle | — | — | — | 10.0 | — |
| Expandant [wt %] | (ii) | Coconut shell flour Coconit 300 | Mahlwerk Neubauer-Friedrich | — | — | — | — | 5.00 |

TABLE 1-continued

Ingredients for producing composite particles of the invention and resultant bulk density thereof.

| Starting material | Ingredients | | Composition of the suspension (weight fractions) | | | | |
|---|---|---|---|---|---|---|---|
| | Constituent | Manufacturer | | | | | |
| | with a bulk density of 500 g/L | Geffers GmbH | | | | | |
| Expandant [wt %] | (ii) Sugar having a bulk density of 850 g/L | Südzucker AG | — | — | — | — | 5.00 |
| 1% sodium alginate solution [wt %] | — Sodium alginate; CAS: 9005-38-3 | Applichem | 65.0 | 65.0 | 65.00 | 60.0 | 57.0 |
| Dispersing solution [wt %] | — Sokalan ® FT CP5 in water (1.2) | BASF | 5.00 | 5.00 | 5.00 | 5.00 | 5.00 |
| Water [wt %] | | | 20.0 | 20.0 | 25.0 | 45.0 | 25.0 |
| | Resultant inventive composite particles | | B36 | B37 | B31 | F3 | E6 |
| | Bulk density immediately before treatment in the muffle furnace [g/L] | | 350 | 260 | 320 | 390 | 300 |
| | Bulk density after treatment in the muffle furnace (inventive composite particles) [g/L] | | 340 | 250 | 305 | 300 | 250 |

(a2) Solidification of the Solidifiable Liquid

The dilute suspension was introduced into plastic syringes and clamped into an LA-30 syringe pump. The delivery rate was 12 to 15 ml/min. The dilute suspension in the syringes was then pressed through a vibrational nozzle, causing the dilute suspension to emerge from the vibrational nozzle in uniform droplets. The droplets falling from the vibrational nozzle fell into a 2% strength aqueous calcium chloride solution ($CaCl_2$), to product name "Calcium Chloride 2-hydrate powder for analysis ACS" from Applichem, CAS No. 10035-04-8, 2 wt % based on the total mass of the calcium chloride solution) and solidified, so that they hardened into hardened droplets and at the same time the refractory substances and also the borosilicate glass beads were encapsulated in the solidifying mixture (consisting of the 1% strength sodium alginate solution and the dispersing solution).

Note: The size of the hardened droplets was dependent on the composition of the dilute suspension, the conveying capacity of the pump and the vibrational frequency of the nozzle.

(a3) Treatment of the Hardened Droplets

The hardened droplets were subsequently scraped off and washed in water.

Thereafter the washed and hardened droplets were dried in a drying oven at 180° C. for 40 minutes. After drying, the resulting hardened droplets were pourable, and their bulk density "immediately before treatment in the muffle furnace" is reported in Table 1.

The pourable hardened droplets were subsequently heated in a preheated muffle furnace at 900° C. for 30 minutes. Cooling resulted in inventive composite particles.

As is evident from the last line of Table 1, the bulk densities measured for the inventive composite particles produced are below 350 g/L. Through a suitable choice of the refractory substances or of the precursors of refractory substances, and the lightweight fillers, the bulk density of resultant inventive composite particles can in fact be reduced to 250 g/L (cf. composite particles B37 and E6 in Table 1).

Sintering Test at 1600° C. for Comparing the Thermal Stability of Inventive and Non-Inventive Composite Particles In accordance with the sintering test described earlier on above, inventive composite particles were tested in comparison to non-inventive composite particles "KHP 108" (core-shell particles from Chemex) and non-inventive particles "W 205-6" ("WeiRe Spheres W250-6" product from Omega Minerals). The inventive and non-inventive particles had a particle size in the range from 0.25 to 0.5 mm. The sintering temperature was 1600° C. The control sieve for determining the sieve residue and the sieve undersize had a mesh size of 0.5 mm.

The results of the sintering tests are set out in Table 2.

TABLE 2

Results of sintering test at 1600° C. (preliminary sintering of the samples, 30 min at 900° C. in the preheated oven, then sintering temperature at 1600° C. for 30 min)

| | inventive composite particles | non-inventive composite particles | non-inventive composite particles |
|---|---|---|---|
| Designation of particles tested | "B36" | "W250-6" | "KHP 108" |
| Particle size [mm] | 0.25-0.5 | 0.25-0.5 | 0.25-0.5 |
| Bulk density [g/L] | 340 | 390 | 540 |
| Result of sieving with 0.5 mm control sieve | sieve residue/ sieve undersize = 0.4 | sieve residue/ sieve undersize = 28.4 | completely melted, sieving not possible |
| Macroscopic appearance after sintering | see FIG. 1 | see FIG. 2 | see FIG. 3 |
| Microscopic appearance after sintering | see FIG. 4 | see FIG. 5 | — |
| Result | not sintered | sintered | fused |

As is evident from Table 2, the ratio of sieve residue to sieve undersize for the inventive composite particles "B36" after sintering is below 1, while this ratio is more than 1 for the non-inventive composite particles after sintering. Accordingly, the thermal stability of the inventive composite particles "B36" at 1600° C. is better than that of the non-inventive composite particles.

Sintering Test at 1700° C. of Inventive Composite Particles and Non-Inventive Composite Particles In accordance with the sintering test described earlier on above, inventive composite particles "B36" were tested in comparison to non-inventive composite particles "Hargreaves" (hollow-bead corundum with >98.8% $Al_2O_3$ from Hargreaves raw material services GmbH) and non-inventive composite particles "KKW" (hollow-bead corundum with >98.8% $Al_2O_3$ from Imerys Fused Minerals Zschornewitz GmbH). The particle sizes of the composite particles were always in the specified range from 0.18 to 0.71 mm. The sintering temperature was 1700° C. The control sieve for determining the sieve residue and the sieve undersize had a mesh size of 0.71 mm.

The results of the test are set out in Table 3:

TABLE 3

Results of sintering test at 1700° C. (preliminary sintering of the samples, 30 min at 900° C. in the preheated oven, then sintering temperature at 1700° C. for 30 min)

|  | inventive composite particles | non-inventive composite particles | non-inventive composite particles |
|---|---|---|---|
| Designation of particles tested | "B36" | "Hargreaves" | "KKW" |
| Particle size [mm] | 0.18-0.71 | 0.18-0.71 | 0.18-0.71 |
| Bulk density [g/L] | 340 | 980 | 770 |
| Result of sieving with 0.71 mm control sieve | sieve residue/ sieve undersize = 0.7 | sieve residue/ sieve undersize > 1 * | sieve residue/ sieve undersize > 1 * |
| Macroscopic appearance after sintering | see FIG. 6 | see FIG. 7 | see FIG. 8 |
| Microscopic appearance after sintering | see FIG. 9 | see FIG. 10 | see FIG. 11 |
| Result | not sintered | sintered | sintered |

* break-up of the sinter cake by sieving not possible

As is evident from Table 3, the ratio of sieve residue to sieve undersize for the inventive composite particles "B36" after sintering is below 1, while this ratio is more than 1 for the non-inventive composite particles after sintering. Accordingly, the thermal stability of the inventive composite particles "B36" at 1700° C. is better than that of the non-inventive composite particles.

Experimental Part 2—"Surface Sealing"

The inventive composite particles B36 (cf. Table 1), after having been heated in a preheated oven at 900° C. for 30 minutes, were surface-sealed as follows.

The surface sealing took place with an aqueous albumen solution containing 6 wt % of High Gel egg white powder (product number 150063) from NOVENTUM Foods, based on the total weight of the aqueous solution formed.

The inventive composite particles B36 were subsequently mixed with the prepared albumen solution in a weight ratio of composite particles to albumen solution of 2:1 and were stirred in the resulting mixture until the albumen solution was completely absorbed. Thereafter the composite particles treated with the albumen solution were dried in a drying oven at 110° C. for 40 minutes. The resulting composite particles are referred to as B36-albumen.

Detection of the water absorption capacity of inventive composite particles B36 (without albumen cladding) and B36-albumen (with albumen cladding) using an Enslin instrument showed that the water absorption of the inventive composite particles is reduced by an albumen cladding from 1.6 ml/g (B36) to 0.1 ml/g (B36-albumen).

Using the constituents indicated in Table 4, the cold-box process (N,N-dimethylpropylamine catalyst) was then used to produce test bars, whose flexural strength was determined in a method based on VDG standard P 73, method A (BOSCH Profi 67 mixer used, processing at room temperature and ambient humidity, production by ramming, test values captured after 1 h and after 24 h, triplicate determination in each case) using the PFG strength testing apparatus with low-pressure manometer N (with motor drive).

TABLE 4

Use of inventive composite particles with and without albumen cladding (i.e. surface sealing). The figures for the weight percentages of the individual constituents are based on the total mass of the respective constitution of the feeder compositions (with composite particles "B36-albumen" or with composite particles "B36").

| Constituents | Constitution of the feeder composition with surface-sealed composite particles "B36-albumen" | Constitution of the feeder composition with non-surface-sealed composite particles "B36" |
|---|---|---|
| KHP 108 0.25-0.5 mm (Chemex raw material) [wt %] | 17.1 | 17.1 |
| KHP 69 0.1-0.3 mm (Chemex raw material) [wt %] | 42.74 | 42.74 |
| Inventive composite particles B36 [wt %] | — | 25.64 |
| Inventive composite particles B36-albumen [wt %] | 25.64 | — |
| Polyisocyanate component (Aktivator 6324, Hüttenes-Albertus) [wt %] | 7.26 | 7.26 |
| Benzyl ether resin component (Gasharz 7241, Hüttenes-Albertus) [wt %] | 7.26 | 7.26 |
| Resultant Inventive feeder element | "V 1" (cf. FIG. 12) | "KS 7" (cf. FIG. 13) |
| 24 h flexural strengths of a test bar made from feeder composition (VDG standard P 73) [N/mm$^2$] (average from three measurements) | 170 | 70 |

Table 4 shows that when albumen is used as an agent for sealing the surface of composite particles produced inventively, test bars are obtained that have increased flexural strength. Corresponding feeder elements are therefore likewise particularly mechanically stable.

It is assumed that the composite particles B36 (without albumen) absorb a comparatively large amount of binder, which is then no longer available to form a flexurally strong binding of the test bars; the same is true, analogously, of corresponding feeder elements.

Experimental Part 3—Production of a Feeder Element (Hereinafter: Inventive Feeder Element) Inventively An inventive feeder element and a non-inventive feeder element were produced, in order to compare them in terms of their insulating properties, thermal stability and practical usefulness, as follows:

inventive feeder element "KS 611" with inventive composite particles "B36-albumen" with sealed surface (see above),
  and non-inventive feeder element "STANDARD" with non-inventive particles KHP 108 (see above) instead of the inventive composite particles "B36-albumen".

(a) Production or provision of inventive composite particles and non-inventive core-shell particles, respectively:

The composite particles "B36-albumen" with sealed surface were produced as described above; the composite particles KHP 108 were provided.

(b) Mixing of the inventive composite particles with sealed surface produced and of the non-inventive core-shell particles with a cold-box binder to give a feeder composition The precise constitutions of the feeder compositions for the non-inventive feeder element "STANDARD" and the inventive feeder element "KS 611" are shown in Table 5 below. They were each mixed to give a homogeneous feeder composition.

(c) Shaping and curing of the feeder composition to give a feeder element.

The feeder compositions for the non-inventive feeder element "STANDARD" and the inventive feeder element "KS 611" were subsequently each shaped in a core-shooting machine and gassed in accordance with the cold-box process (N,N-dimethylpropylamine catalyst). This gave the non-inventive feeder element "STANDARD" and the inventive feeder element "KS 611".

TABLE 5

Constituents of the feeders used for casting (cube test). The figures for the weight percentages of the individual constituents are based on the total mass of the respective constitution of the feeder compositions (for the feeder element "STANDARD" and the feeder element "KS 6II" respectively).

| Constituents | Constitution of the feeder composition for the feeder element "STANDARD" (not Inventive) | Constitution of the feeder composition for the feeder element "KS 6II" (Inventive) |
|---|---|---|
| KHP 69 [wt %] | 59.83 | 59.83 |
| Non-inventive and non-surface sealed composite particles KHP 108 [wt %] | 25.65 | — |
| Inventive composite particles "B36-albumen" [wt %] | — | 25.65 |
| Polyisocyanate component (Aktivator 6324, Hüttenes-Albertus) [wt %] | 7.26 | 7.26 |
| Benzyl ether resin component (Gasharz 7241, Hüttenes-Albertus) [wt %] | 7.26 | 7.26 |

(d) Casting of a cube of iron using an inventive feeder "KS 611" and a non-inventive feeder "STANDARD"

The inventive feeder "KS 611" and the non-inventive feeder "STANDARD" (as described above) were tested for their performance utility using so-called cube tests. These tests investigate in particular which feeder element exhibits the better feeding capacity when producing a casting in the form of a cube.

The feeders produced according to the constitutions from Table 5 were each cast to the 1.2 cm modulus at 1400° C. with iron (GGG40) in the cube test.

The cuboid iron castings thus produced, with residual iron feeders, are shown in the halved condition (by sawing) in FIG. 14 (result when using a non-inventive feeder) and in FIG. 15 (result when using an inventive feeder).

FIG. 14 shows side cavities which extend down to a depth of 4 mm in the cast cube (cf. inscription "−4" in FIG. 14; distance between upper drawn line and lower drawn line=4 mm, upper line marks boundary between casting and the residual metallic feeder, lower line marks lowest penetration point of the side cavity).

FIG. 15 shows cavities only in the residual metallic feeder; no cavities extend into the cast cube (cf. inscription "7" and "13" in FIG. 15; distance between upper drawn line and lower to drawn line=7 and 13 mm, respectively, lower line marks boundary between casting and residual metallic feeder, upper line marks lowest point of the cavity in the residual metallic feeder; different values "7 mm" and "13 mm" result from the width of the sawblade).

From FIGS. 14 and 15 it is evident that the inventive feeder element "KS 611" possesses improved feeding capacity in comparison to the non-inventive feeder element "STANDARD".

The invention claimed is:

1. A method for producing a feeder element for the foundry industry, comprising the following steps:
(a) producing composite particles having a particle size of less than 2 mm, determined by sieving, in a matrix encapsulation method with the following steps:
(a1) producing droplets of a suspension from at least the following starting materials:
(i) one or more refractory substances selected from the group consisting of refractory solids and precursors of refractory solids,
(ii) one or more density-reducing substances selected from the group consisting of lightweight fillers having a respective bulk density in the range from 10 to 350 g/L, expandants, and pyrolysable fillers, and
(iii) as continuous phase, a solidifiable liquid,
(a2) solidifying the solidifiable liquid, so the droplets harden to hardened droplets and the one or more refractory substances and the one or more density-reducing substances are encapsulated in the solidified continuous phase,
(a3) heat-treating the hardened droplets so the composite particles result,
(b) mixing the composite particles produced in step (a) or a fraction of the composite particles with a binder and, optionally, further constituents to give a feeder composition, and
(c) shaping and curing the feeder composition to give the feeder element;
wherein the one or more refractory substances are encapsulated in the solidified continuous phase in the feeder element.

2. The method as claimed in claim 1, wherein
in step (a1) droplets are produced by means of one or more nozzles, and/or
in step (a2) the solidifying of the solidifiable liquid is induced by cooling, drying or chemical reaction.

3. The method as claimed in claim 1, wherein the solidifiable liquid used in step (a1) is a liquid which is solidifiable by chemical reaction and in step (a2) the solidifying of the solidifiable liquid is induced by chemical reaction.

4. The method as claimed in claim 1, wherein the solidifiable liquid is a liquid solidifiable by cation exchange reaction.

5. The method as claimed in claim 4, wherein the solidifiable liquid is a liquid solidifiable by reaction with calcium ions and/or barium ions and/or manganese ions.

6. The method as claimed in claim 1, wherein the solidifiable liquid is a liquid solidifiable by reaction with calcium ions, which comprises one or more binders selected from the group consisting of alginate, PVA, chitosan and sulphoxyethylcellulose, and/or is an aqueous solution, in which case the solidifiable liquid is an aqueous alginate solution.

7. The method as claimed in claim 1, wherein the lightweight filler or at least one of the lightweight fillers used in step (a) as density-reducing substance of component (ii) is selected from the group consisting of: inorganic hollow beads, organic hollow beads, particles of porous or foamed material, rice husk ash, core-shell particles, and calcined kieselguhr, and/or
wherein the expandant or at least one of the expandants used in step (a) as component (ii) is selected from the group consisting of: carbonates, hydrogencarbonates, oxalates, coconut shell flour, walnut shell flour, grape kernel flour, olive stone flour, starch, wheat flour, maize flour, potato dextrin, sugars, plant seeds, wood flour, and rice husk ash; and/or
wherein the pyrolysable filler or at least one of the pyrolysable fillers used in step (a) as component (ii) is selected from the group consisting of: plastics beads and Styropor beads.

8. The method as claimed in claim 7, wherein the density-reducing substance of component (ii) has a particle size of less than 0.8 mm, determined by sieving.

9. The method as claimed in claim 1, wherein the refractory solid or at least one of the refractory solids used in step (a1) as refractory substance of component (i) is selected from the group consisting of:
oxides, nitrides, carbides, each comprising one or more elements from the group consisting of Si, Al, Zr, Ti, Mg and Ca;
mixed oxides, mixed carbides, mixed nitrides, each comprising one or more elements from the group consisting of Si, Al, Zr, Ti, Mg and Ca; and
graphite.

10. The method as claimed in claim 9, wherein the refractory solid or at least one of the refractory solids used in step (a1) as refractory substance of component (i) is selected from the group consisting of aluminium oxide, zirconium oxide, titanium dioxide, graphite, silicon dioxide, magnesium oxide, calcium oxide, calcium silicate, phyllosilicates, aluminium silicates, magnesium aluminium silicate, silicon carbide, and boron nitride; and/or
the precursor or at least one of the precursors of refractory solids that is used in step (a1) as refractory substance of component (i) is selected from the group consisting of aluminium hydroxide, magnesium hydroxide, phyllosilicates, clays, phosphates and carbonates.

11. The method as claimed claim 1, wherein the heat-treating as per step (a3) is carried out such that the bulk density of the resultant composite particles is lower than the bulk density of the hardened droplets in the dried state and/or
the said composite particles possess a bulk density <700 g/L.

12. The method as claimed in claim 1, wherein the composite particles resulting in step (a3) and/or the composite particles used in step (b) at least partly possess a particle size in the range from 0.125 mm to 0.5 mm, determined by sieving.

13. The method as claimed in claim 1, wherein component (ii) comprises, as density-reducing substance or substances, one or more expandants and the heat-treating as per step (a3) is carried out such that the expandant or the two or more expandants expand and so form cavities in the resultant composite particle and/or
comprises one or more pyrolysable fillers and the heat-treating as per step (a3) is carried out such that the pyrolysable filler or the two or more pyrolysable fillers pyrolyse and so form cavities in the resultant composite particle.

14. The method of claim 1, wherein the binder is a cold-box binder and the curing is by a cold-box curing method.

15. The method as claimed in claim 1, wherein component (i) comprises, as refractory substances, one or more precursors of refractory solids and the heat-treating as per step (a3) converts the precursors into a refractory solid, and
wherein the precursor or at least one of the precursors of refractory solids is a clay and the heat-treating as per step (a3) comprises a thermal treatment at a temperature in the range from 900 to 980° C.

16. The method as claimed in claim 15, wherein a temperature of 1000° C. is not exceeded during the thermal treatment.

17. The method as claimed in claim 15, wherein in step (b) an organic binder is used as binder, and
wherein in step (c) the curing takes place by a cold-box method by gassing with an organic amine.

18. The method as claimed in claim 15, wherein in step (b) one or more further constituents are used which are selected from the group consisting of spheres of fly ash, rice husk ash, core-shell particles, calcined kieselguhr, aluminium, magnesium, silicon, iron oxide, manganese oxide, silicon dioxide, chamotte, mullite, potassium nitrate and sodium nitrate.

19. A feeder element producible by a method as claimed in claim 15.

* * * * *